(12) United States Patent  
Doble et al.

(10) Patent No.: US 12,355,768 B2  
(45) Date of Patent: Jul. 8, 2025

(54) TECHNIQUES FOR MANAGING REQUESTS IN A MULTI-TENANT ENVIRONMENT

(71) Applicant: Oracle International Corporation, Redwood Shores, CA (US)

(72) Inventors: James Talmage Doble, Raleigh, NC (US); Dmitrii Lipin, Bellevue, WA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 205 days.

(21) Appl. No.: 18/211,829

(22) Filed: Jun. 20, 2023

(65) Prior Publication Data

US 2024/0214380 A1 Jun. 27, 2024

Related U.S. Application Data

(60) Provisional application No. 63/434,226, filed on Dec. 21, 2022.

(51) Int. Cl.  
*H04L 9/40* (2022.01)

(52) U.S. Cl.  
CPC .......... *H04L 63/0884* (2013.01); *H04L 63/10* (2013.01)

(58) Field of Classification Search  
CPC .. H04L 63/0884; H04L 63/10; H04L 63/0281  
See application file for complete search history.

(56) References Cited

U.S. PATENT DOCUMENTS

| 2007/0053361 | A1* | 3/2007 | Chen | H04L 65/1016 370/392 |
| 2017/0279912 | A1* | 9/2017 | Zhang | H04L 67/564 |

* cited by examiner

*Primary Examiner* — Huan V Doan  
(74) *Attorney, Agent, or Firm* — Kilpatrick Townsend & Stockton LLP

(57) ABSTRACT

A method may include receiving a request to access a cloud resource associated with a user from a service component in an application container. The method may include determining a proxy service running in the application container and transmitting the request to the proxy service. The method may include generating, a proxy authentication including information identifying a private endpoint and transmitting, by the proxy service, the request and the proxy authentication to an egress proxy service. The method may also include processing the request, producing a processed request based on attributes of the request. The method may include determining an address associated with the private endpoint. The method may also include transmitting, by the egress proxy service, the processed request to the private endpoint. The method may also include providing, by the egress proxy service via the private endpoint, the service component with access to the cloud resource.

20 Claims, 10 Drawing Sheets

TECHNIQUES FOR MANAGING REQUESTS IN A MULTI-TENANT ENVIRONMENT

CROSS-REFERENCE TO RELATED APPLICATIONS

This application is claims priority under 35 U.S.C. § 119(e) to U.S. Provisional Application No. 63/434,226, filed on Dec. 21, 2022, the contents of which is herein incorporated by reference.

BACKGROUND

Cloud services providers may host different tenants on a single data plane. The different tenants may use services that require access to respective private resources. Different tenants may also utilize the same name and/or address of respective private resources, leading to poor data security and/or cumbersome access of services.

SUMMARY

In an embodiment, a method may include receiving, by a service component of a data plane, a request to access a cloud resource associated with a user. The service component may be running in an application container of the data plane. The method may include determining, by the service component, a proxy service of the data plane. The proxy service may also be running in the application container. The method may include transmitting, by the service component, the request to access the cloud resource to the proxy service of the data plane. The method may include generating, by the proxy service of the data plane, a proxy authentication. The proxy authentication may include information identifying a private endpoint. The method may also include transmitting, by the proxy service of the data plane, the request to access the cloud resource and the proxy authentication to an egress proxy service of the data plane. The method may also include processing, by the egress proxy service of the data plane, the request to produce a processed request based at least in part on one or more attributes of the request. The method may include determining, by the egress proxy service of the data plane, an address associated with the private endpoint based at least in part on one of the proxy authentication or the processed request. The method may also include transmitting, by the egress proxy service of the data plane, the processed request to access the cloud resource to the private endpoint. Based at least in part on the processed request, the method may also include providing, by the egress proxy service of the data plane and via the private endpoint, the service component with access to the cloud resource.

In some embodiments, the service component of the data plane may be configured to generate the proxy authentication, and the service component may transmit the request to access the cloud resource and the proxy authentication the egress proxy service. In some embodiments, the proxy authentication may be included in a proxy authentication header. In some embodiments, the proxy authentication may be generated based at least in part on a local port used to send the request to access the cloud resource. In some embodiments, the request to access the cloud resource may be initiated by the service component. In some embodiments, each user of the plurality of tenants may be associated with a specific private endpoint and a specific proxy service. In some embodiments, the proxy service may include an adaptive proxy configured to process access requests using multiple proxy protocols.

In some embodiments, processing the request may also include accessing one or more application programming interfaces (API) associated with the cloud resource. Processing the request may also include providing, to the service component and using the API, access to at least one of a private service and a private resource. In some embodiments, the processing may also include accessing an internal resource including one or more access policies associated with at least one of a tenant, the service component, or the cloud resource. The processing may also include determining that an access policy of the one or more access policies indicates that the service is permitted to access at least one of the private endpoint or the cloud resource.

In an embodiment, a system may include one or more processors and one or more non-transitory computer-readable media. The non-transitory computer-readable media may include instructions that when executed by the one or more processors, cause the system to perform operations. According to the operations, the system may receive, by a service component of a data plane, a request to access a cloud resource associated with a user. The service component may be running in an application container of the data plane. The system may determine, by the service component, a proxy service of the data plane. The proxy service may also be running in the application container. The system may transmit, by the service component, the request to access the cloud resource to the proxy service of the data plane. The system may then generate, by the proxy service of the data plane, a proxy authentication. The proxy authentication may include information identifying a private endpoint. The system may transmit, by the proxy service of the data plane, the request to access the cloud resource and the proxy authentication to an egress proxy service of the data plane. The system may also process, by the egress proxy service of the data plane, the request to produce a processed request based at least in part on one or more attributes of the request. The system may determine, by the egress proxy service of the data plane, an address associated with the private endpoint based at least in part on one of the proxy authentication or the processed request. The system may also transmit, by the egress proxy service of the data plane, the processed request to access the cloud resource to the private endpoint. Based at least in part on the processed request, the system may provide, by the egress proxy service of the data plane and via the private endpoint, the service component with access to the cloud resource.

In some embodiments, the service component of the data plane may be configured to generate the proxy authentication, and the service component may transmit the request to access the cloud resource and the proxy authentication the egress proxy service. In some embodiments, the proxy authentication may be included in a proxy authentication header. In some embodiments, the proxy authentication may be generated based at least in part on a local port used to send the request to access the cloud resource. In some embodiments, the request to access the cloud resource may be initiated by the service component. In some embodiments, each user of the plurality of tenants may be associated with a specific private endpoint and a specific proxy service. In some embodiments, the proxy service may include an adaptive proxy configured to process access requests using multiple proxy protocols.

In some embodiments, processing the request may also include accessing one or more application programming interfaces (API) associated with the cloud resource. Processing the request may also include providing, to the service component and using the API, access to at least one of a private service and a private resource. In some embodiments, the processing may also include accessing an internal resource including one or more access policies associated with at least one of a tenant, the service component, or the cloud resource. The processing may also include determining that an access policy of the one or more access policies indicates that the service is permitted to access at least one of the private endpoint or the cloud resource.

In an embodiment, a non-transitory computer-readable storage medium may store a set of instructions. When executed by one or more processors of a computing system, the instructions may cause the computing system to perform operations. The operations may include receiving, by a service component of a data plane, a request to access a cloud resource associated with a user. The service component may be running in an application container of the data plane. The operations may include determining, by the service component, a proxy service of the data plane. The proxy service may also be running in the application container. The operations may include transmitting, by the service component, the request to access the cloud resource to the proxy service of the data plane. The operations may include generating, by the proxy service of the data plane, a proxy authentication. The proxy authentication may include information identifying a private endpoint. The operations may also include transmitting, by the proxy service of the data plane, the request to access the cloud resource and the proxy authentication to an egress proxy service of the data plane. The operations may also include processing, by the egress proxy service of the data plane, the request to produce a processed request based at least in part on one or more attributes of the request. The operations may include determining, by the egress proxy service of the data plane, an address associated with the private endpoint based at least in part on one of the proxy authentication or the processed request. The operations may also include transmitting, by the egress proxy service of the data plane, the processed request to access the cloud resource to the private endpoint. Based at least in part on the processed request, the operations may also include providing, by the egress proxy service of the data plane and via the private endpoint, the service component with access to the cloud resource.

In some embodiments, the service component of the data plane may be configured to generate the proxy authentication, and the service component may transmit the request to access the cloud resource and the proxy authentication the egress proxy service. In some embodiments, the proxy authentication may be included in a proxy authentication header. In some embodiments, the proxy authentication may be generated based at least in part on a local port used to send the request to access the cloud resource. In some embodiments, the request to access the cloud resource may be initiated by the service component. In some embodiments, each user of the plurality of tenants may be associated with a specific private endpoint and a specific proxy service. In some embodiments, the proxy service may include an adaptive proxy configured to process access requests using multiple proxy protocols.

In some embodiments, processing the request may also include accessing one or more application programming interfaces (API) associated with the cloud resource. Processing the request may also include providing, to the service component and using the API, access to at least one of a private service and a private resource. In some embodiments, the processing may also include accessing an internal resource including one or more access policies associated with at least one of a tenant, the service component, or the cloud resource. The processing may also include determining that an access policy of the one or more access policies indicates that the service is permitted to access at least one of the private endpoint or the cloud resource.

DETAILED DESCRIPTION

Figure 1:
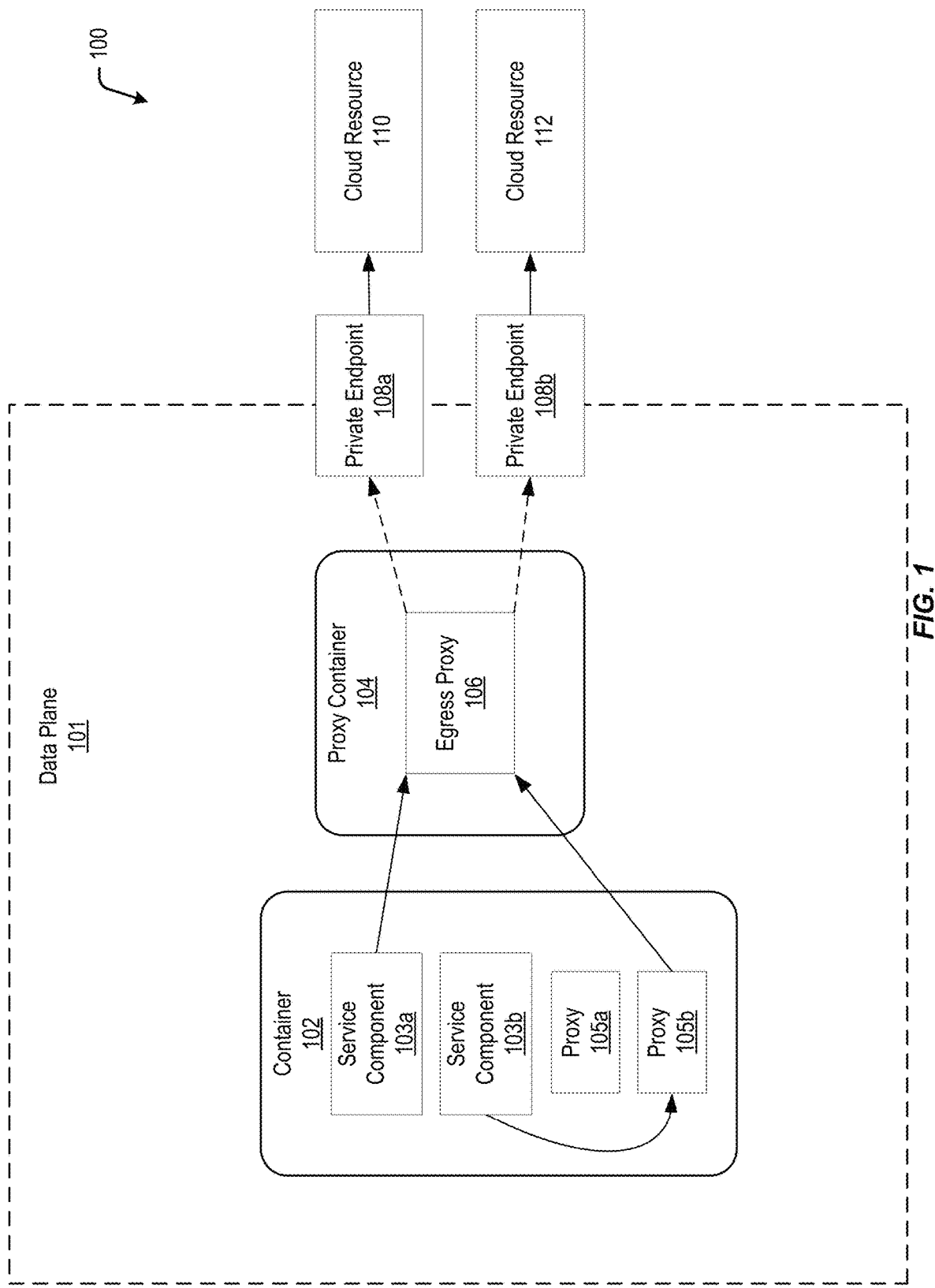
FIG. 1 illustrates a multi-tenant system with an egress proxy service, according to certain embodiments.

A cloud services provider may allow different tenants to use various services hosted in a single environment. The different tenants may host various private resources (e.g., data) outside of the environment. However, as multiple tenants may be accessing services within the same environment, there may be a risk of one tenant accidentally (or intentionally) accessing private resources of another tenant. For privacy and other security reasons, access to the private resources should be limited to only the tenant that owns the resource.

In an example, a tenant A and a tenant B may both use a service that requires access to a respective on-premise data store. Because the respective on-premise data stores are unique to each tenant, and therefore private, each tenant may use the same address for their on-premise data store. For example, tenant A's respective on-premise data store may have an address of db.1. Likewise, tenant B may have their own on-premise data store with the address of db.1. Thus, if tenant A uses the service to call for db.1 using a shared DNS provider, tenant A may be directed to tenant B's on-premise data store. The inverse may also be true. Further complications may arise because some services provide endpoint-specific processing on their own (such as private DNS services). Additionally, some services may not support the specialized processing required to access private resources via private endpoints. A private endpoint may be mechanism by which private resources associated with a specific tenant can be accessed. Allowing multiple services to access private endpoints may be disadvantageous from a security perspective, as it may be better to restrict access (e.g., to private endpoints) to a single dedicated service.

One solution may be to create a virtual machine assigned to each tenant to provide DNS services for each respective tenant. This solution has its own issues, however. For example, the number of virtual machines needed would be equal to the number of tenants. This could be thousands or hundreds of thousands for a given cloud services provider. Another approach may be to create a proxy subsystem to handle requests for all tenants and/or services. To properly identify the private endpoint associated with each tenant, a dedicated port may be opened on the proxy subsystem for each tenant. But this approach may expose a large number of ports which can be time consuming and resource intensive. A container with a small number of ports open (e.g., single digits) may alleviate some of these concerns.

Another solution may include a proxy subsystem generated to handle requests for multiple tenants and/or services, and utilize proxy authentication information, sent with the requests to identify the appropriate private endpoint. The proxy subsystem may be hosted on a virtual machine within a data plane. One or more services may also be implemented within the data plane, each running multiple services for one or more tenants. The proxy subsystem may be configured to receive a resource request from a service. The proxy subsystem may then identify a private endpoint associated with the tenant making the request. To do so, the proxy subsystem should know, for each individual request from a service and/or tenant, the private endpoint that is associated with that request. The proxy subsystem may then process the access request. Processing the access request may include accessing an internal resource. The internal resource may include a library containing address information associated with various resources and/or private endpoints belonging to the tenant. The internal resources may also include access policies for each of the tenants and/or services within the VCN. Processing the access request may also include verifying that the tenant and/or service has permission to access the resource. Processing the access request may also include resolving an address associated with a hostname. After processing the access request, the proxy subsystem may then establish a connection between the resource and the service.

Some service components may include an off-the-shelf client library that cannot generate proxy authentications on a per-request basis. In this case, such a service component may receive a request to access a cloud resource from a tenant of a cloud services provider. The service component may be running within a container of a data plane. The service component may then determine a proxy service associated with the tenant, also running on the container, and transmit the request to the proxy service. The proxy service may then generate a proxy authentication and transmit the request to an egress proxy. The egress proxy may be running in a second container, also hosted on the data plane. The egress proxy may process the request, including determining an address of a private endpoint associated with the tenant. After transmitting the processed request, the egress proxy may provide the service component with access to the request resource.

FIG. 1 illustrates a multitenant system 100 with an egress proxy service 106, according to certain embodiments. A data plane 101 may include a container 102, a proxy container 104, and private endpoints (PEs) 108a-b. One or more cloud resources 110 and 112 may be located outside of the data plane 101.

The data plane 101 may include a network of virtual machines (e.g., worker nodes) maintained by a cloud services provider. The data plane 101 may be accessed by one or more customers of the cloud services provider and include one or more compute instances. The one or more customers may be associated with the one or more compute instances. The one or more customers may also be referred to as tenants. In some embodiments, any one of the one or more compute instances may be accessed by the one or tenants at any given time, including simultaneously.

The container 102 may be running on an instance of a computing device instantiated by the cloud services provider within the data plane 101. The container 102 may host service components 103a-b. The container 102 may be multi-tenant, e.g., able to be accessed by a plurality of tenants (e.g., cloud services users). The service components 103a-b may include one or more client libraries. It should be understood that any operations and/or capabilities described in relation to the service components 103a-b may also refer to any client libraries used thereby. The service components 103a-b may be a part of an application or other service provided to the one or more tenants by the cloud services provider. In some embodiments, the service component 103a-b may be configured to generate proxy authentications on a per-request basis. In other embodiments, the service component 103 may not generate proxy authentications on a per request basis.

The container 102 may also host local proxy services 105a-b. Each local proxy service 105a-b may be associated with a specific tenant and/or a private endpoint (e.g., the private endpoints 108a-b). Each of the local proxy services 105a-b may be configured to receive requests from the service components 103a-b via a port specific to each local proxy service 105a-b. In this way, the specific tenant sending the request and the private endpoint associated with the request may be identified. For example, the local proxy service 105a may be associated with the first tenant, and the local proxy service 105b may be associated with the second tenant. A first request may be transmitted to the local proxy service 105a via a first port. The local proxy service 105a may then generate proxy authentication information.

In some embodiments, one or more of the local proxy services 105a-b may be lazy-initiated. For example, when the service components 103a-b are configured, the service component 103a-b may be configured to transmit a request for cloud resources via associated ports, where each cloud resource is associated with a specific tenant. The same process that configures the service components 103a-b may also instantiate a local proxy service configured to receive requests via one of the associated ports. If a request for a cloud resource is received by the service components 103a-b from a tenant without a corresponding proxy service, the same process may then instantiate the corresponding local proxy service.

Each of the tenants may also be associated with a cloud resource, where the cloud resource is private and may only be accessible by the associated tenant. Because the service components 103a-b is accessible by the plurality of tenants, the service components 103a-b may access multiple private cloud resources, each cloud resource associated with a specific tenant. It may therefore be necessary to restrict access to each of the private cloud resources of any tenant besides the associated tenant. For example, if a cloud resource 110 be associated with a first tenant, access to the cloud resource 110 may not be granted to a second tenant. Likewise, the cloud resource 112 may be associated with the second tenant, and access not granted to the first tenant.

The proxy container 104 may be a virtual machine maintained by the cloud services provider and may not be observable by any tenant. The proxy container 104 may also host an egress proxy service 106. The egress proxy service 106 may be configured to receive multiple proxy protocols (e.g., HTTPS or SOCKS5). The egress proxy service 106 may be an adaptive proxy, able to adapt according to request using any proxy protocol. For example, some service components may be configured to operate on a particular proxy protocol while other service components may run on a different proxy protocol. Thus, the egress proxy service 106 may be used to provide access to a variety of clients using a variety of proxy protocols, eliminating a desire for multiple proxies to handle multiple proxy protocols.

The proxy container 104 may establish a connection with one of the cloud resources 110 or 112 through one or more of the private endpoints 108a-b using the egress proxy service 106. The private endpoints 108a-b may correspond to a particular tenant of the cloud services provider. The egress proxy service 106 may therefore enable the particular tenant to access the private endpoint associated with that particular tenant. The private endpoints 108a-b may provide access to resources outside of the data plane 101 to the corresponding tenant via the container 102 and/or the service components 103a-b.

The private endpoint 108a may enable the container 102 and/or the service components 103a-b to access a first resource belonging to a first tenant, such as the cloud resource 110. The private endpoint 108b may enable the container 102 and/or the service components 103a-b to access a second resource belonging to a second tenant, such as the cloud resource 112. The private endpoints 108a-b may provide access to a single resource, associated with the corresponding tenant, or to several resources associated with the tenant.

For example, the cloud resources 110 and 112 may reside within private VCN's associated with the first and second tenant respectively. The service component 103a may be used by the first tenant to request access to the cloud resource 110. The private endpoint 108a may then provide a private DNS service based on a request such that the service component 103 can access an on-premise data store at the cloud resource 110.

In an embodiment, the service component 103a may establish a connection with the egress proxy service 106. The service connection may be a TCP connection. The service connection may allow data to pass to and from the service component 103 and the egress proxy service 106. The egress proxy service 106 may determine a proxy protocol used by the service component 103 and adapt accordingly. Thus, a single egress proxy service 106 may be used to provide access to a variety of clients using a variety of proxy protocols. The egress proxy service 106 may receive the access request including the proxy authentication.

The service component 103a may send an access request access to the egress proxy service 106. The access request may include data identifying a resource such as the cloud resource 110. For example, the data identifying the resource may be an IP address or a hostname. The access request may also include a proxy authentication. The proxy authentication may include information identifying the tenant and private endpoint 108a associated with the cloud resource 110. The proxy authentication may also include identifying information corresponding to the service component 103, a tenant making the request, and/or the container 102. The manner in which proxy authentication is conveyed to the proxy subsystem may depend on the particular proxy protocol being used. In some embodiments, the proxy authentication may be conveyed in a proxy authentication header (e.g., Proxy-Authorization for HTTP proxy protocol). In other embodiments, the proxy authentication may be conveyed using protocol messages (e.g., an access request using SOCKS proxy protocol).

The egress proxy service 106 may then process the access request and/or the proxy authentication to produce a processed request. The processing may include determining a private endpoint 108a-b using the proxy authentication, a type of resource requested, and other such attributes. The processing may also include accessing an internal resource. In some embodiments, the internal resource may include a library containing address information corresponding to each private endpoints 108a-b and/or information used to resolve a hostname.

The processing may additionally or alternatively include accessing one or more access policies associated with each of the tenants using the container 102 and/or service component 103a-b. The one or more access policies may prevent a tenant using the service components 103a-b from accidentally accessing a private resource of another tenant. The one or more access policies may also prevent data from redirecting requests to the wrong private endpoint. In some embodiments, the internal resource may be accessed by the egress proxy service 106 by making API calls to and thus accessing one or more private services/resources.

After processing the access request and/or the proxy authentication, the egress proxy service 106 may determine an address associated with one of the private endpoints 108a-b that corresponds with the access request and/or the proxy authentication. For example, if the access request identifies the cloud resource 110, the egress proxy service 106 may determine an address associated with the private endpoint 108a. Similarly, if the access request identifies the cloud resource 112, the egress proxy service may determine an address associated with the private endpoint 108b. In some embodiments, the egress proxy service 106 may determine an address of one of the private endpoints 108a-b and forward the processed request without identifying a requested resource.

The private endpoint 108a may utilize information included in the processed request, to access the cloud resource 110. For example, the processed request may include an IP address. The private endpoint 108a may then determine that the tenant using the service component 103a and/or container 102 to send the request is permitted to access the cloud resource 110. The private endpoint 108a may then provide access to the cloud resource 110 to the service component 103. In another example, the request may include a hostname associated with a resource. The private endpoint 108a may perform DNS services to resolve the hostname and determine the address necessary for accessing the cloud resource 110 associated with the tenant and/or hostname. Alternatively or additionally, the cloud resource 110 may perform DNS services to determine the address necessary for locating a specific resource included in the cloud resource 110 (e.g., a resource within a private VCN).

The egress proxy service 106 may establish a proxy connection with the cloud resource 110 through the private endpoint 108a. The egress proxy service 106 may then provide access to the resource using the proxy connection. The proxy connection may allow data to be transferred to and from the cloud resource 110 and the service component 103.

In some embodiments a client or service may not be able to generate proxy authentication on a per-request basis. For example, the service component 103b of the container 102 may be a legacy service and therefore lack a capability to generate proxy authentication on a per-request basis. The service component 103b may be capable of generating proxy authentication, but it may use the same proxy authentication for every request no matter which tenant is using the service. However, per-request proxy authentication may be needed to identify the tenant and/or the private endpoint associated with a request. The service component 103b may receive an access request to access the cloud resource 112. Because the service component 103b may lack the capability to generate proxy authentication on a per-request basis, the service component 103b may forward the request to the local proxy service 105b. The cloud services provider may configure the local proxy service 105b to be hosted with the container 102 because the service component 103b lacks the capability to provide the proxy authentication. Furthermore, the local proxy service 105b may be configured as an adaptive proxy, capable of providing proxy services using multiple proxy protocols (e.g., HTTP and SOCKS5).

The local proxy service 105b may be configured to provide proxy authentication corresponding to a specific private endpoint, such as the private endpoint 108b. In some embodiments, the local proxy service 105b may be constantly running with the container 102. In other embodiments, the local proxy service 105b may be lazy-initiated, e.g., only being instantiated in response to determining the service component 103b is requesting access to a resource and/or private endpoint that has no corresponding proxy service yet instantiated. Determining that the resource and/or private endpoint has no associated proxy service may be accomplished by service code being executed by the virtual machine running the container 102 and/or service component 103b. The service code may also cause the local proxy service 105b to be instantiated.

There may be multiple instances of proxy services similar to the local proxy service 105b running inside the container 102. Each of the multiple instances of proxy services may use a respective local port such that no two instances of the proxy services use the same port. The proxy services may also include and/or access a mapping between the local ports and a respective private endpoint. For example, the local proxy service 105a may be configured to utilize port 34001, associated with the private endpoint 108a. Similarly, the local proxy service 105b may be configured to utilize port 34002, associated with the private endpoint 108b. Thus, the service component 103a may be configured to transmit access requests using "localhost:34001" as its proxy, as the local port 34001 is mapped to the private endpoint 108a. The service component 103b may be configured to use "localhost:34002" as its proxy, as the local port 34002 is mapped to the private endpoint 108b.

In this case, the service component 103b may be configured to use a local port associated with the private endpoint 108b to transmit the access request. The local proxy service 105b may receive the access request through the local port. In response to receiving the access request through the local port, the local proxy service 105b may generate the proxy authentication and transmit the proxy authentication to the egress proxy service 106. The egress proxy service 106 may then process the access request and the proxy authentication generated by the local proxy service 105b, then provide a connection to the cloud resource 112 using the private endpoint 108b.

Figure 2:
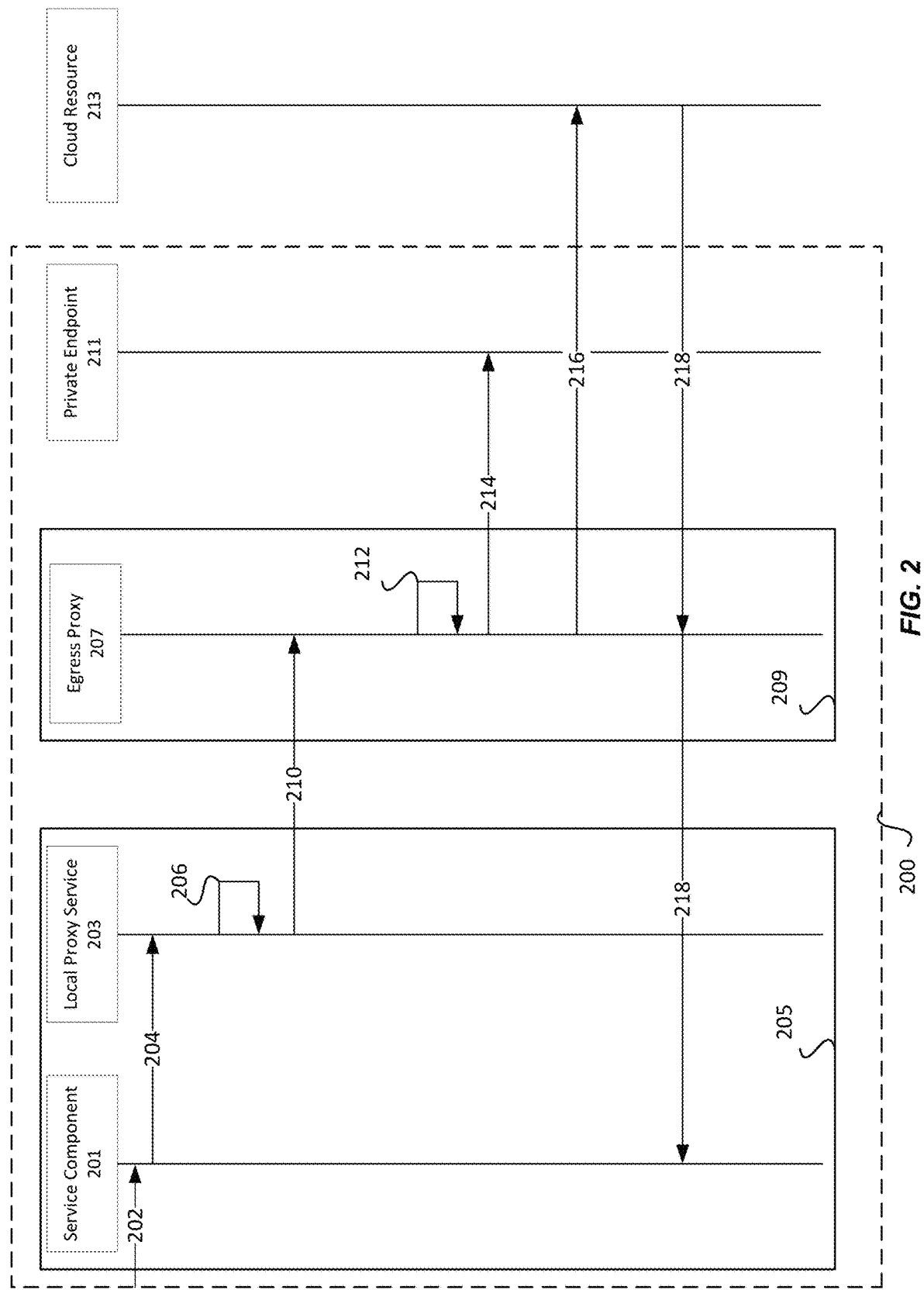
FIG. 2 illustrates a workflow for providing access to a cloud resource using a proxy service, according to certain embodiments.

FIG. 2 illustrates a workflow for providing access to a cloud resource 213 using a local proxy service 203, according to certain embodiments. The workflow may be performed by all or some of the systems described in relation to FIG. 1. For example, the workflow may be performed at least partially within a data plane 200. The data plane may include a service component 201 and a local proxy service 203, hosted on a container 205. The data plane 200 may also include an egress proxy service 207 hosted on a proxy container 209. The data plane 200 may also include a private endpoint 211 that provides access outside the data plane 200. The private endpoint 211 may provide access to the cloud resource 213.

The container 205 may be accessed by a plurality of tenants of a cloud services provider, similar to the container 102 in FIG. 1. Therefore, the service component 201 may be accessed by the plurality of tenants at the same time. The local proxy service 203 may be associated with a first tenant of the plurality of tenants, similar to the local proxy service 105a. Although only one container 205 is shown, there may be any number of containers similar to the container 205 in the data plane 200, each with their own service components. Similarly, even though only one service component 201 is shown, there may be any number of service components hosted on the container 205. The container 205 may also include any number of proxy services, each associated with a specific tenant of the plurality of tenants accessing the container 205.

The proxy container 209 may host the egress proxy service 207. The proxy container 209 may be accessible by multiple containers hosted on the data plane 200. The egress proxy service 207 may be configured to receive multiple proxy protocols (e.g., HTTPS or SOCKS5). The egress proxy service 207. may be an adaptive proxy, able to adapt according to request using any proxy protocol. For example, some service components may be configured to only operate on a particular proxy protocol while other service components may run on a different proxy protocol. Thus, the egress proxy service 207 may be used to provide access to a variety of clients using a variety of proxy protocols, eliminating a desire for multiple proxies to handle multiple proxy protocols.

The private endpoint 211 may enable the container 205 and/or the service component 103a to access to the cloud resource 213. The private endpoint 211 and/or the egress proxy 207 may be configured to process an access request to produce a processed request. The private endpoint 211 and the cloud resource 213 may both be associated with the same specific tenant of the plurality of tenants accessing the container 205. The cloud resource 213 may be any resource outside the data plane 200, such as a private VCN, a database, a computing system, or other such resource.

At step 202, the workflow may include receiving, by the service component 201, a request to access the cloud resource 213. In some embodiments, the service component 201 may initiate the request to access the cloud resource. The request may be made by a specific tenant of the plurality of tenants accessing the container 205. The request may be made from within, the container 205 (and/or an associated application), the data plane 200, or may be received from outside the data plane 200. The request may include an IP address, hostname, or other such information corresponding to the cloud resource 213.

The service component 201 may determine that the request is made by the specific tenant. The service component 201 may then determine that a specific port is associated with the specific tenant. At step 204, the workflow may include transmitting the request to the local proxy service 203 using the specific port. The local proxy service 203 may be associated with the specific tenant and/or the private endpoint 211. At step 206, the local proxy service 203 may generate a proxy authentication. The proxy authentication may include information associated with the specific tenant and/or the private endpoint 211. In some embodiments, the proxy authentication may include information associated with the cloud resource 213. The local proxy service 203 may be configured as an adaptive proxy, capable of providing proxy services using multiple proxy protocols (e.g., HTTP and SOCKS5).

At step 210, the local proxy service 203 may transmit the request and the proxy authentication to the egress proxy service 207. The local proxy service 203 may establish a service connection with the egress proxy service 207 prior to transmitting the access request. The service connection may be implemented using TCP, TCP/IP, or any appropriate protocols for transmitting data. In some embodiments, the proxy authentication may be conveyed in a proxy authentication header (e.g., a proxy authorization header for an access request using the HTTP proxy protocol). In other embodiments, the proxy authentication may be conveyed using protocol messages (e.g., a message including the proxy authentication accompanying the access request using the SOCKS proxy protocol).

At step 212, the egress proxy service 207 may process the access request and/or the proxy authentication to produce a processed request. Processing the access request may include determining an address associated with the private endpoint 211 using the authentication information and/or the access request. In some embodiments, the egress proxy service 207 may access the private endpoint 211 to process the access request (e.g., providing DNS services, address translations, and other such services). In some embodiments, determining the address may also be performed by accessing an internal resource. The internal resource may include a library containing address information associated with private endpoints associated with the service component 201 and/or addresses corresponding to one or more hostnames. The internal resource may also include one or more access policies associated with the tenant running the service and/or the service. In some embodiments, the internal resource may be accessed by making API calls to one or more private services/resources.

At step 214, the egress proxy service 207 may transmit the processed request and/or the proxy authentication to the private endpoint 211. In some embodiments, the private endpoint 211 may further process the processed request and/or the proxy authentication to provide access to the cloud resource 213. For example, the processed request may include an IP address. The private endpoint 211 may then determine that the tenant using the service component 201 and/or container 205 to send the request is permitted to access the cloud resource 213. The private endpoint 211 may then provide access to the cloud resource 213 to the service component 201. In another example, the request may include a hostname associated with a resource. The private endpoint 211 may perform DNS services to resolve the hostname and determine the address necessary for accessing the cloud resource 213 associated with the tenant and/or hostname.

At step 216, the egress proxy service 207 may establish a connection to the cloud resource 213 via the private endpoint 211. The connection may be implemented using TCP, TCP/IP, or any appropriate protocols for transmitting data. At step 218, the egress proxy service may provide the service component 201 with access to the cloud resource 213 via the private endpoint 211, the egress proxy service 207, and the local proxy 203. The access may be based at least in part on the proxy authentication and/or the processed request.

Figure 3:
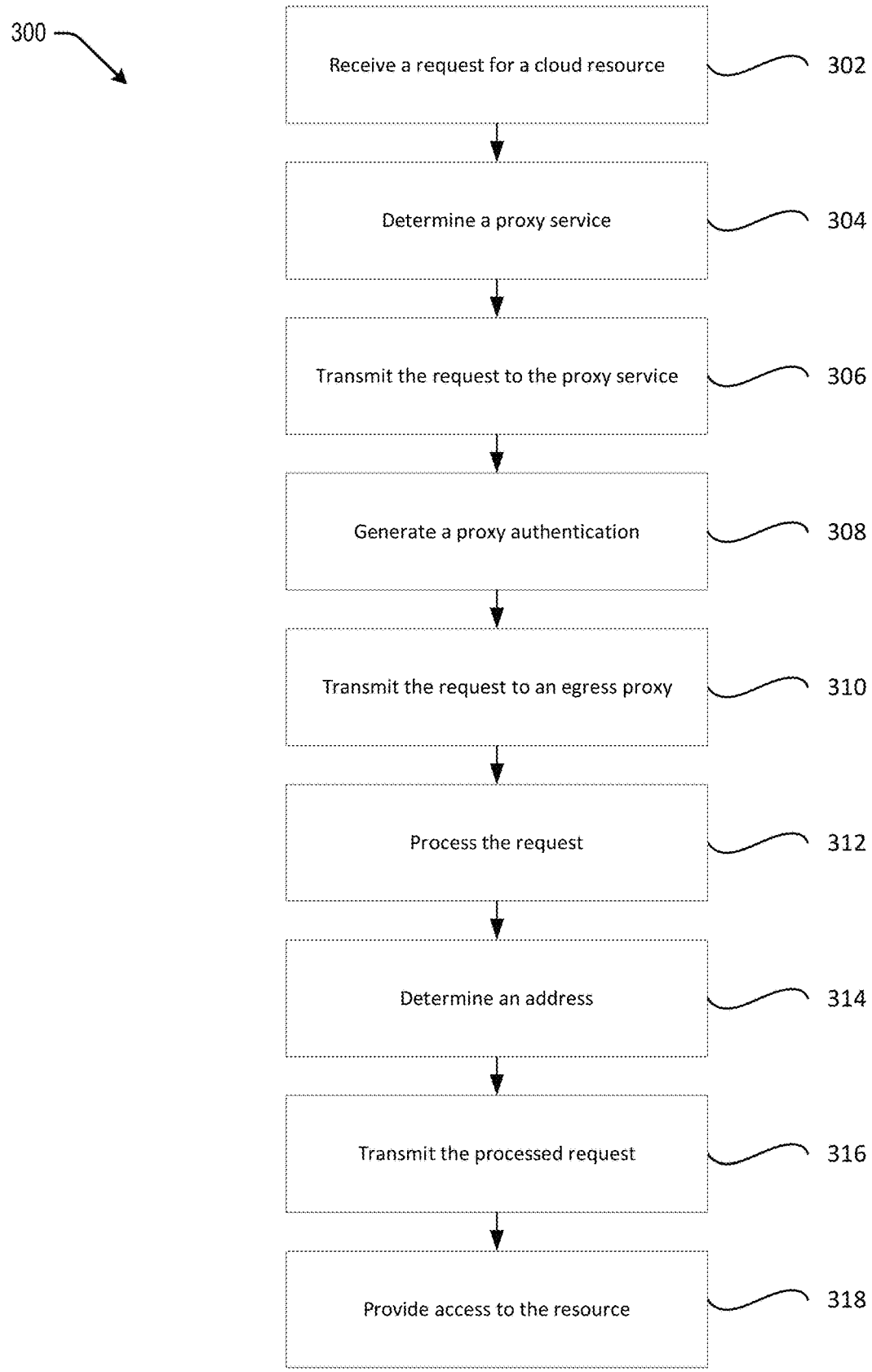
FIG. 3 illustrates a flowchart of a method for accessing a cloud resource, according to certain embodiments.

FIG. 3 illustrates a flowchart of a method 300 for accessing a cloud resource, according to certain embodiments. The method 300 may be performed by some or all of the systems described herein, such as those described in FIG. 1. While the operations of methods 300 are described as being performed by a computing system, it should be understood that any suitable device may be used to perform one or more operations of these processes. The methods 300 (described below) are respectively illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform functions or implement data types. The order in which the operations are described is not intended to be construed as a limitation, and any number of the described operations can be combined in any order and/or in parallel to implement the processes.

At step 302, the method 300 includes receiving, by a service component of a data plane, a request to access a cloud resource. In some embodiments, the service component may initiate the request to access the cloud resource. The service component may be similar to the service component to the service component 103b in FIG. 1. The service component may include and/or use one or more client libraries. The service component 103b may be hosted in an application container, similar to the container 102. The application container may be running on an instance of a computing device instantiated by the cloud services provider. The application container may be multi-tenant, able to be accessed by a plurality of tenants (or cloud services users). The service component may be a part of an application or other service provided to the plurality of tenants by the cloud services provider, and therefore accessed and/or used by multiple tenants. In some embodiments, the service component may not generate proxy authentication on a per request basis.

The request may include information associated with a specific tenant and/or private endpoint accessing the service component. The request may also include information identifying a cloud resource. For example, the data identifying the cloud resource may be an IP address or a hostname, or other such information.

At step 304, the method 300 includes determining, by the service component of the data plane, a proxy service of the application container. The proxy service may be associated with the specific tenant and/or a private endpoint. The service component may also determine a local port associated with the specific tenant. The local port may also be associated with the private endpoint and/or the cloud resource. At step 306, the method 300 may include transmitting, by the service component of the data plane, the request to access the cloud resource. The service component may transmit the request to the proxy service via the local port.

The proxy service may be running in the same application container. The proxy service may be associated with the specific tenant and/or private endpoint. Furthermore, the proxy service may be configured as an adaptive proxy, capable of providing proxy services using multiple proxy protocols (e.g., HTTP and SOCKS5). In some embodiments, the proxy service may be constantly running with the application container. In other embodiments, the proxy service may be lazy-initiated, e.g., only being instantiated in response to determining the service component is requesting access for a tenant and/or to a private endpoint that has no corresponding proxy service yet instantiated. Determining that the resource and/or private endpoint has no associated proxy service may be accomplished by service code being executed by the virtual machine running the application container and/or service component. The service code may also cause the proxy service to be instantiated.

At step 308, the method 300 includes generating, by the proxy service, a proxy authentication. The proxy authentication may include information identifying the private endpoint associated with the specific tenant. At step 310, the method 300 includes transmitting, by the proxy service, the request to access the cloud resource to an egress proxy service. The egress proxy service may be hosted by a proxy container running within the same data plane as the application container (and therefore the service component). The proxy service may also transmit the proxy authentication. The proxy service may transmit the request and/or the proxy authentication using TCP, TCP/IP, or any appropriate protocols for transmitting data. In some embodiments, the proxy authentication may be conveyed in a proxy authentication header (e.g., a proxy authorization header for an access request using the HTTP proxy protocol). In other embodiments, the proxy authentication may be conveyed using protocol messages (e.g., a message including the proxy authentication accompanying the access request using the SOCKS5 proxy protocol).

At step 312, the method 300 includes processing, by the egress proxy service, the request to create a processed request. Processing the request may additionally include authenticating the request. Processing the access request may include accessing an internal resource. The internal resource may include a library containing address information associated with resources associated with the tenant using running the client. The internal resources may also include one or more access policies associated with the service running the client. In some embodiments, the internal resource may be accessed by making API calls to one or more private services/resources.

Processing the access request may also include determining that the specific tenant is authorized to access the cloud resource identified in the request, based at least in part on access policies included in the internal resource. For example, an access request may include an IP address. Processing the access request may then include determining the specific tenant is permitted access the cloud resource at the IP address. One of ordinary skill in the art would recognize many other operations that may be included in processing the request.

At step 314, the method 300 includes determining, by the egress proxy service, an address associated with the private endpoint. The address may be determined based on the proxy authentication and/or the processed request. The private endpoint may be included within the data plane. In some embodiments, the egress proxy service may access the private endpoint to process the access request (e.g., providing DNS services, address translations, and other such services).

At step 316, the method 300 includes transmitting, by the egress proxy service, the processed request and/or the proxy authentication to the private endpoint. The egress proxy service may transmit the request and/or the proxy authentication using TCP, TCP/IP, or any appropriate protocols for transmitting data. In some embodiments, the private endpoint may utilize information included in the processed request and/or the proxy authentication to access the cloud resource.

In another example, the request may include a hostname associated with a resource. The private endpoint may perform DNS services to resolve the hostname and determine the address necessary for accessing the cloud resource associated with the tenant and/or hostname. Alternatively or additionally, the cloud resource 110 may perform services to determine the address necessary for locating a specific resource included in the cloud resource (e.g., a resource within a private VCN). In some embodiments, the private endpoint may perform one or more services in conjunction with the egress proxy before receiving the processed request.

At step 318, the method 300 includes providing the service component, by the egress proxy service, access to the cloud resource via the private endpoint. The access may be provided based at least in part on the processed request and/or the proxy authentication.

Figure 4:
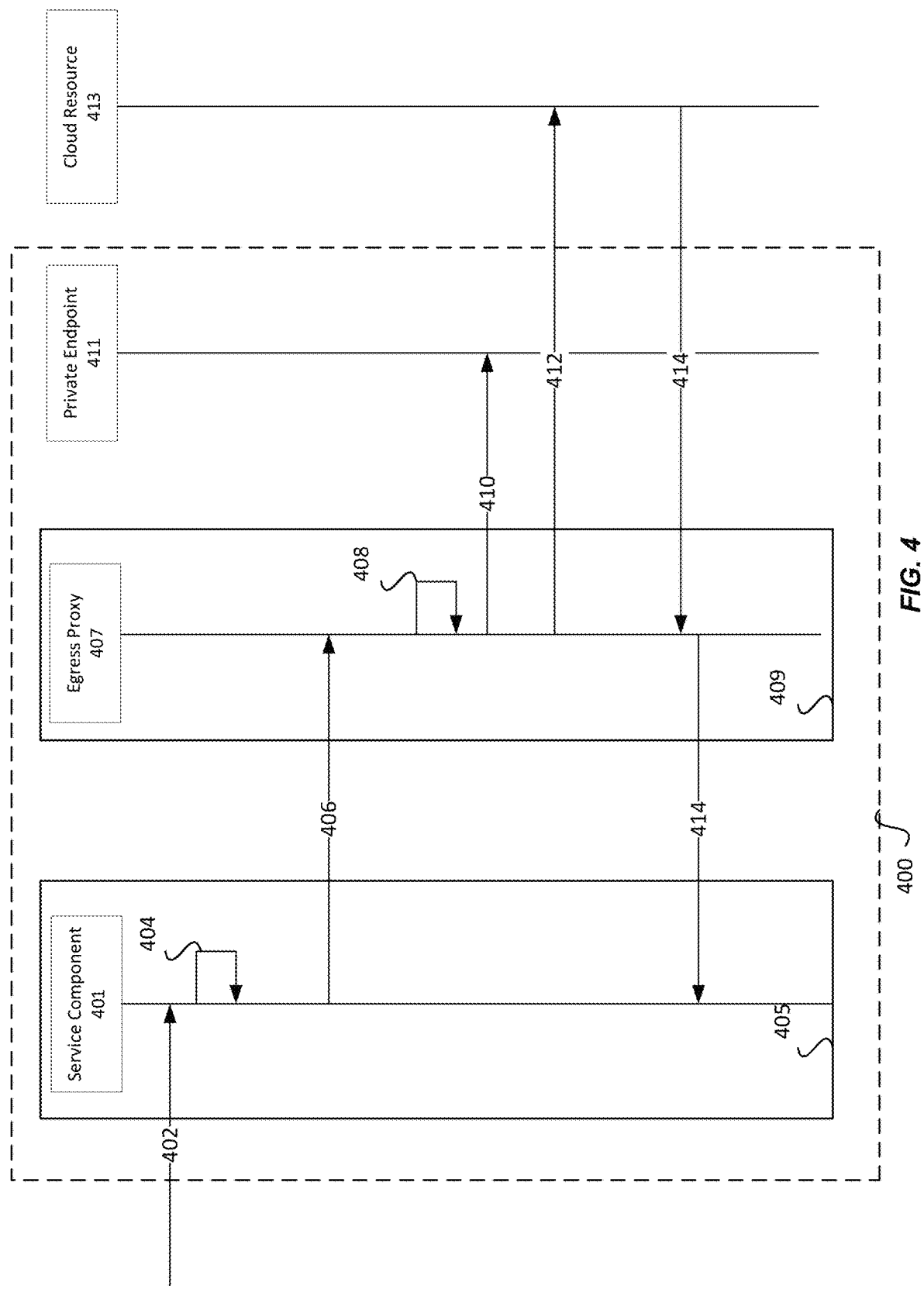
FIG. 4 illustrates a workflow for providing access to a cloud resource, according to certain embodiments.

FIG. 4 illustrates a workflow for providing access to a cloud resource 413, according to certain embodiments. The workflow may be performed by some or all of the systems described in FIG. 1. For example, the workflow may be performed at least partially within a data plane 400. The data plane 400 may include a service component 401 hosted on a container 405. The data plane 200 may also include an egress proxy service 407 hosted on a proxy container 409. The data plane 400 may also include a private endpoint 411 configured to provide access to cloud resources outside the data plane 400. The private endpoint 411 may provide access to a cloud resource 413.

The container 405 may be accessed by a plurality of tenants of a cloud services provider, similar to the container 102 in FIG. 1. Therefore, the service component 401 may also be accessed by the multiple tenants at the same time. Although only one container 405 is shown, there may be any number of containers similar to the container 405 in the data plane 400, each with their own service components. Similarly, even though only one service component 401 is shown, there may be any number of service components hosted on the container 405. The container 405 may also include any number of proxy services, each associated with a specific tenant of the plurality of tenants accessing the container 405.

The service component and/or associated client libraries may be configured to generate a proxy authentication on a per request basis. In other words, each time a specific tenant makes a request via the service component 401, the service component 401 may generate a customized proxy authentication corresponding to the specific tenant. In some embodiments, the proxy authentication may be conveyed in a proxy authentication header (e.g., a proxy authorization header for an access request using the HTTP proxy protocol). In other embodiments, the proxy authentication may be conveyed using protocol messages (e.g., a message including the proxy authentication accompanying the access request using the SOCKS5 proxy protocol).

The proxy container 409 may host the egress proxy service 407. The proxy container 409 may be accessible by multiple containers hosted on the data plane 400. The egress proxy service 407 may be configured to receive multiple proxy protocols (e.g., HTTPS or SOCKS5). The egress proxy service 407 may be an adaptive proxy, able to adapt according to request using any proxy protocol. For example, some service components may be configured to only operate on a particular proxy protocol, while others may run on a different proxy protocol. Thus, the egress proxy service 407 may be used to provide access to a variety of service components using a variety of proxy protocols, eliminating a desire for multiple proxies to handle multiple proxy protocols.

The private endpoint 411 may enable the container 405 and/or the service component 103*a* to access to the cloud resource 413. The private endpoint 411 may be configured to process an access request to produce a processed request. The private endpoint 411 and the cloud resource 413 may both be associated with the same specific tenant of the plurality of tenants accessing the container 405. The cloud resource 413 may be any resource outside the data plane 400, such as a private VCN, a database, a computing system, or other such resource.

At step 402, the workflow may include receiving, by the service component 401, a request to access the cloud resource 413. In some embodiments, the service component 401 may initiate the request. The request may be made by a specific tenant of the plurality of tenants accessing the container 405. The request may be made from within the data plane 400 or may be received from outside the data plane 400. The request may include an IP address, hostname, or other such information corresponding to the cloud resource 413. In some embodiments, the service component may initiate the request to access the cloud resource.

The service component 401 may determine that the request is made by the specific tenant. At step 404, the service component 201 may generate a proxy authentication. The proxy authentication may include information associated with the specific tenant and/or the private endpoint 411. In some embodiments, the proxy authentication may include information associated with the cloud resource 413 (e.g., access credentials).

At step 406, the service component 401 may transmit the request and the proxy authentication to the egress proxy service 407. The service component 401 may establish a service connection with the egress proxy service 407 prior to transmitting the access request. The service connection may be implemented using TCP, TCP/IP, or any appropriate protocols for transmitting data. In some embodiments, the proxy authentication may be conveyed in a proxy authentication header (e.g., a proxy authorization header for an access request using the HTTP proxy protocol). In other embodiments, the proxy authentication may be conveyed using protocol messages (e.g., a message including the proxy authentication accompanying the access request using the SOCKS5 proxy protocol).

At step 408, the egress proxy service 407 may process the access request and/or the proxy authentication to produce a processed request. Processing the access request may include determining an address associated with the private endpoint 411 using the authentication information and/or the access request. In some embodiments, the egress proxy service 207 may access the private endpoint 211 to process the access request (e.g., providing DNS services, address translations, and other such services). In some embodiments, determining the address may also be performed by accessing an internal resource. The internal resource may include a library containing address information associated with private endpoints associated with the service component 401 and/or addresses corresponding to one or more hostnames. The internal resource may also include one or more access policies associated with the tenant running the service and/or the service. In some embodiments, the internal resource may be accessed by making API calls to one or more private services/resources.

At step 410, the egress proxy service 207 may transmit the processed request and/or the proxy authentication to the private endpoint 411. In some embodiments, the private endpoint 411 may further process the processed request and/or the proxy authentication to provide access to the cloud resource 413. For example, the processed request may include an IP address. The private endpoint 411 may then determine that the tenant using the service component 401 and/or container 405 to send the request is permitted to access the cloud resource 413. The private endpoint 411 may then provide access to the cloud resource 413 to the service component 401. In another example, the request may include a hostname associated with a resource. The private endpoint 411 may perform DNS services to resolve the hostname and determine the address necessary for accessing the cloud resource 413 associated with the tenant and/or hostname.

At step 412, the egress proxy service 207 may establish a connection to the cloud resource 413 via the private endpoint 411. The connection may be implemented using TCP, TCP/IP, or any appropriate protocols for transmitting data. At step 418, the egress proxy service may provide the service component 401 with access to the cloud resource 413 via the private endpoint 411. The access may be based at least in part on the proxy authentication and/or the processed request.

Figure 5:
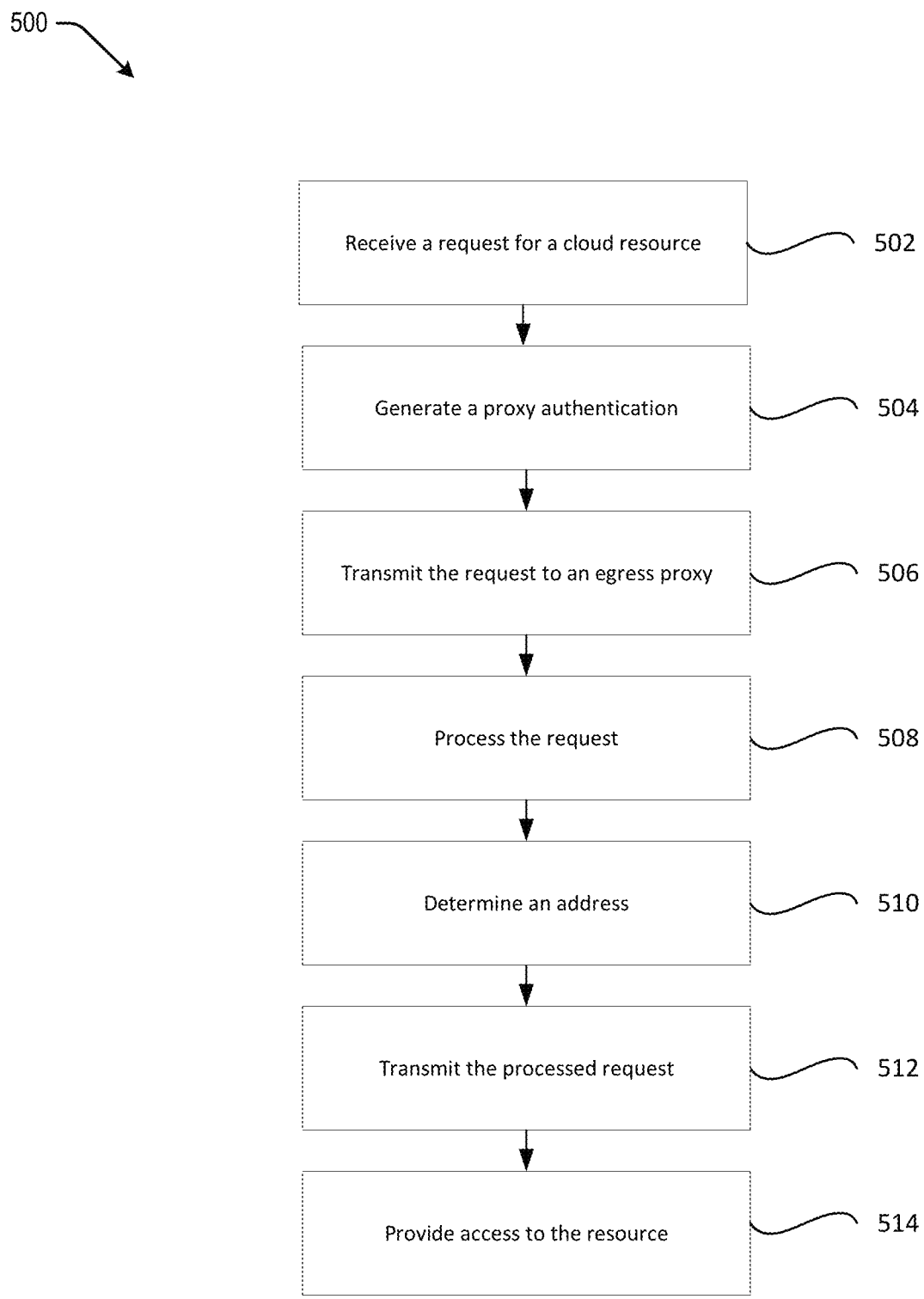
FIG. 5 illustrates a flowchart of a method for accessing a cloud resource, according to certain embodiments.

FIG. 5 illustrates a flowchart of a method 500 for accessing a cloud resource, according to certain embodiments. The method 500 may be performed by some or all of the systems described herein, such as those described in FIG. 1. While the operations of methods 500 are described as being performed by a computing system, it should be understood that any suitable device may be used to perform one or more operations of these processes. The methods 500 (described below) are respectively illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform functions or implement data types. The order in which the operations are described is not intended to be construed as a limitation, and any number of the described operations can be combined in any order and/or in parallel to implement the processes.

At step 502, the method 500 includes receiving, by a service component of a data plane, a request to access a cloud resource. In some embodiments, the service component may initiate the request to access the cloud resource. The service component may be similar to the service component to the service component 103*b* in FIG. 1. The service component may be hosted in an application container, similar to the container 102. The application container may be running on an instance of a computing device instantiated by the cloud services provider. The application container may be multi-tenant, able to be accessed by a plurality of tenants (or cloud services users). The service component may be a part of an application or other service provided to the plurality of tenants by the cloud services provider, and therefore accessed by multiple tenants. The service component may be configured to generate proxy authentications on a per request basis.

The request may include information associated with a specific tenant accessing the service component. The request may also include information identifying a cloud resource. For example, the data identifying the cloud resource may be an IP address or a hostname, or other such information.

At step 504, the method 300 includes generating, by the proxy service, a proxy authentication. The proxy authentication may include information identifying the private endpoint associated with the specific tenant. At step 506, the method 500 includes transmitting, by the service component, the request to access the cloud resource to an egress proxy service. The egress proxy service may be hosted by a proxy container running within the same data plane as the application container (and therefore the service component). In some embodiments, the proxy authentication may be conveyed using protocol messages (e.g., a message including the proxy authentication accompanying the access request using the SOCKS5 proxy protocol). In other embodiments, the proxy authentication may be conveyed in a proxy authentication header (e.g., a proxy authorization header for an access request using the HTTP proxy protocol). The service component may also transmit the proxy authentication. The service component may transmit the request and/or the proxy authentication using TCP, TCP/IP, or any appropriate protocols for transmitting data.

At step 508, the method 500 includes processing, by the egress proxy service, the request to create a processed request. Processing the request may additionally include authenticating the request. Processing the access request may include accessing an internal resource. The internal resource may include a library containing address information associated with resources associated with the tenant using running the client. The internal resources may also include one or more access policies associated with the service running the client. In some embodiments, the internal resource may be accessed by making API calls to one or more private services/resources.

Processing the access request may also include determining that the specific tenant is authorized to access the cloud resource identified in the request, based at least in part on access policies included in the internal resource. For example, an access request may include an IP address. Processing the access request may then include determining the specific tenant is permitted access the cloud resource at the IP address. One of ordinary skill in the art would recognize many other operations that may be included in processing the request.

At step 510, the method 300 includes determining, by the egress proxy service, an address associated with the private endpoint. The address may be determined based on the proxy authentication and/or the processed request. The private endpoint may be included within the data plane. In some embodiments, the egress proxy service may access the private endpoint to process the access request (e.g., providing DNS services, address translations, and other such services).

At step 512, the method 300 includes transmitting, by the egress proxy service, the processed request and/or the proxy authentication to the private endpoint. The egress proxy service may transmit the request and/or the proxy authentication using TCP, TCP/IP, or any appropriate protocols for transmitting data. In some embodiments, the private endpoint may utilize information included in the processed request and/or the proxy authentication to access the cloud resource. For example, the processed request may include an IP address. The private endpoint may then determine that the specific tenant using the service component and/or container to send the request is permitted to access the cloud resource.

In another example, the request may include a hostname associated with a resource. The private endpoint may perform DNS services to resolve the hostname and determine the address necessary for accessing the cloud resource associated with the tenant and/or hostname. Alternatively or additionally, the cloud resource may perform services to determine the address necessary for locating a specific resource included in the cloud resource (e.g., a resource within a private VCN). In some embodiments, the private endpoint may perform one or more services (e.g., DNS services) in conjunction with the egress proxy prior to receiving the processed request.

At step 514, the method 300 includes providing the service component, by the egress proxy service, access to the cloud resource via the private endpoint. The access may be provided based at least in part on the processed request and/or the proxy authentication.

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (example services include billing software, monitoring software, logging software, load balancing software, clustering software, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 6:
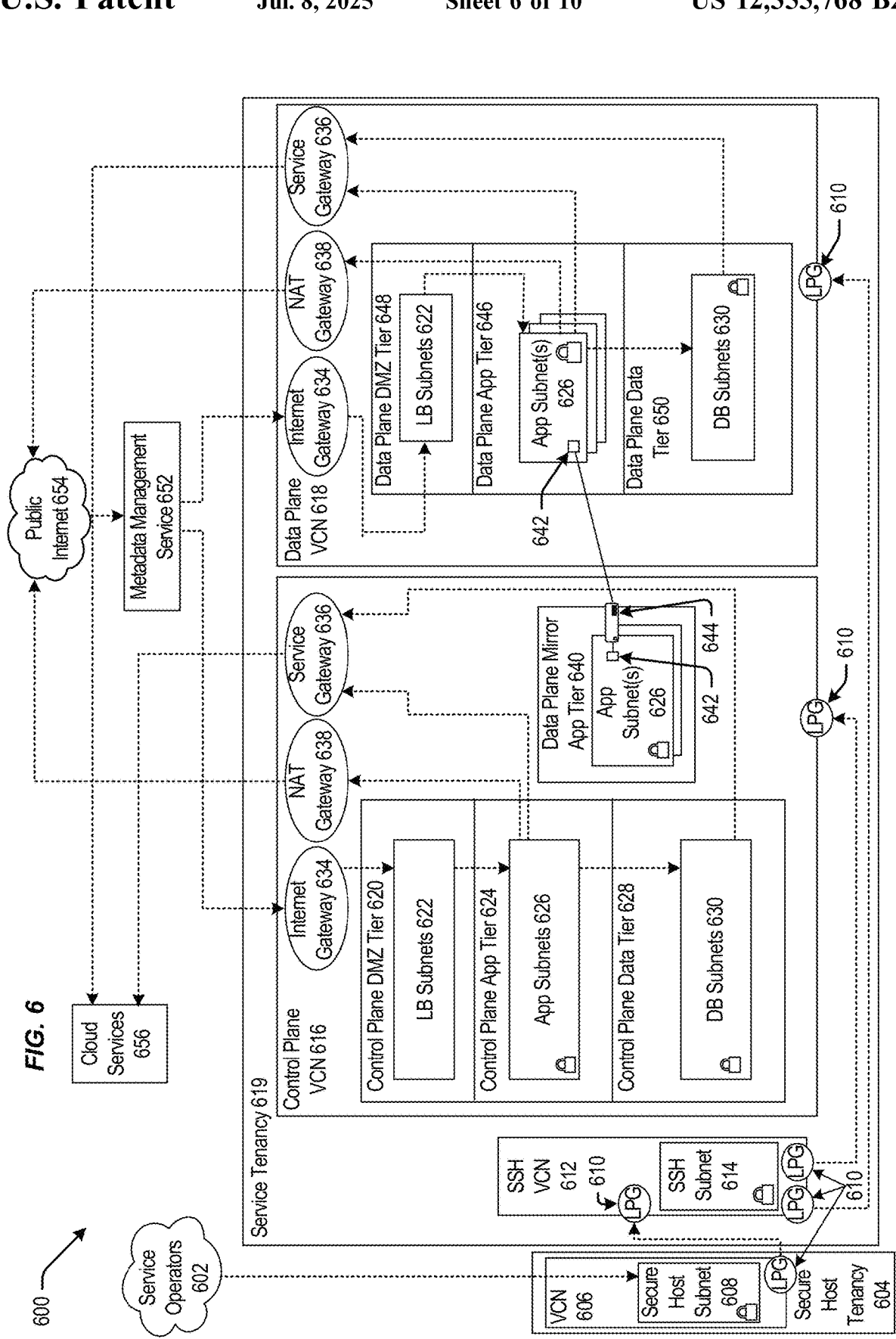
FIG. 6 is a block diagram illustrating one pattern for implementing a cloud infrastructure as a service system, according to at least one embodiment.

FIG. 6 is a block diagram 600 illustrating an example pattern of an IaaS architecture, according to at least one embodiment. Service operators 602 can be communicatively coupled to a secure host tenancy 604 that can include a virtual cloud network (VCN) 606 and a secure host subnet 608. In some examples, the service operators 602 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 606 and/or the Internet.

The VCN 606 can include a local peering gateway (LPG) 610 that can be communicatively coupled to a secure shell (SSH) VCN 612 via an LPG 610 contained in the SSH VCN 612. The SSH VCN 612 can include an SSH subnet 614, and the SSH VCN 612 can be communicatively coupled to a control plane VCN 616 via the LPG 610 contained in the control plane VCN 616. Also, the SSH VCN 612 can be communicatively coupled to a data plane VCN 618 via an LPG 610. The control plane VCN 616 and the data plane VCN 618 can be contained in a service tenancy 619 that can be owned and/or operated by the IaaS provider.

The control plane VCN 616 can include a control plane demilitarized zone (DMZ) tier 620 that acts as a perimeter network (e.g., portions of a corporate network between the corporate intranet and external networks). The DMZ-based servers may have restricted responsibilities and help keep breaches contained. Additionally, the DMZ tier 620 can include one or more load balancer (LB) subnet(s) 622, a control plane app tier 624 that can include app subnet(s) 626, a control plane data tier 628 that can include database (DB) subnet(s) 630 (e.g., frontend DB subnet(s) and/or backend DB subnet(s)). The LB subnet(s) 622 contained in the control plane DMZ tier 620 can be communicatively coupled to the app subnet(s) 626 contained in the control plane app tier 624 and an Internet gateway 634 that can be contained in the control plane VCN 616, and the app subnet(s) 626 can be communicatively coupled to the DB subnet(s) 630 contained in the control plane data tier 628 and a service gateway 636 and a network address translation (NAT) gateway 638. The control plane VCN 616 can include the service gateway 636 and the NAT gateway 638.

The control plane VCN 616 can include a data plane mirror app tier 640 that can include app subnet(s) 626. The app subnet(s) 626 contained in the data plane mirror app tier 640 can include a virtual network interface controller (VNIC) 642 that can execute a compute instance 644. The compute instance 644 can communicatively couple the app subnet(s) 626 of the data plane mirror app tier 640 to app subnet(s) 626 that can be contained in a data plane app tier 646.

The data plane VCN 618 can include the data plane app tier 646, a data plane DMZ tier 648, and a data plane data tier 650. The data plane DMZ tier 648 can include LB subnet(s) 622 that can be communicatively coupled to the app subnet(s) 626 of the data plane app tier 646 and the Internet gateway 634 of the data plane VCN 618. The app subnet(s) 626 can be communicatively coupled to the service gateway 636 of the data plane VCN 618 and the NAT gateway 638 of the data plane VCN 618. The data plane data tier 650 can also include the DB subnet(s) 630 that can be communicatively coupled to the app subnet(s) 626 of the data plane app tier 646.

The Internet gateway 634 of the control plane VCN 616 and of the data plane VCN 618 can be communicatively coupled to a metadata management service 652 that can be communicatively coupled to public Internet 654. Public Internet 654 can be communicatively coupled to the NAT gateway 638 of the control plane VCN 616 and of the data plane VCN 618. The service gateway 636 of the control plane VCN 616 and of the data plane VCN 618 can be communicatively couple to cloud services 656.

In some examples, the service gateway 636 of the control plane VCN 616 or of the data plane VCN 618 can make application programming interface (API) calls to cloud services 656 without going through public Internet 654. The API calls to cloud services 656 from the service gateway 636 can be one-way: the service gateway 636 can make API calls to cloud services 656, and cloud services 656 can send requested data to the service gateway 636. But, cloud services 656 may not initiate API calls to the service gateway 636.

In some examples, the secure host tenancy 604 can be directly connected to the service tenancy 619, which may be otherwise isolated. The secure host subnet 608 can communicate with the SSH subnet 614 through an LPG 610 that may enable two-way communication over an otherwise isolated system. Connecting the secure host subnet 608 to the SSH subnet 614 may give the secure host subnet 608 access to other entities within the service tenancy 619.

The control plane VCN 616 may allow users of the service tenancy 619 to set up or otherwise provision desired resources. Desired resources provisioned in the control plane VCN 616 may be deployed or otherwise used in the data plane VCN 618. In some examples, the control plane VCN 616 can be isolated from the data plane VCN 618, and the data plane mirror app tier 640 of the control plane VCN 616 can communicate with the data plane app tier 646 of the data plane VCN 618 via VNICs 642 that can be contained in the data plane mirror app tier 640 and the data plane app tier 646.

In some examples, users of the system, or customers, can make requests, for example create, read, update, or delete (CRUD) operations, through public Internet 654 that can communicate the requests to the metadata management service 652. The metadata management service 652 can communicate the request to the control plane VCN 616 through the Internet gateway 634. The request can be received by the LB subnet(s) 622 contained in the control plane DMZ tier 620. The LB subnet(s) 622 may determine that the request is valid, and in response to this determination, the LB subnet(s) 622 can transmit the request to app subnet(s) 626 contained in the control plane app tier 624. If the request is validated and requires a call to public Internet 654, the call to public Internet 654 may be transmitted to the NAT gateway 638 that can make the call to public Internet 654. Metadata that may be desired to be stored by the request can be stored in the DB subnet(s) 630.

In some examples, the data plane mirror app tier 640 can facilitate direct communication between the control plane VCN 616 and the data plane VCN 618. For example, changes, updates, or other suitable modifications to configuration may be desired to be applied to the resources contained in the data plane VCN 618. Via a VNIC 642, the control plane VCN 616 can directly communicate with, and can thereby execute the changes, updates, or other suitable modifications to configuration to, resources contained in the data plane VCN 618.

In some embodiments, the control plane VCN 616 and the data plane VCN 618 can be contained in the service tenancy 619. In this case, the user, or the customer, of the system may not own or operate either the control plane VCN 616 or the data plane VCN 618. Instead, the IaaS provider may own or operate the control plane VCN 616 and the data plane VCN 618, both of which may be contained in the service tenancy 619. This embodiment can enable isolation of networks that may prevent users or customers from interacting with other users', or other customers', resources. Also, this embodiment may allow users or customers of the system to store databases privately without needing to rely on public Internet 654, which may not have a desired level of threat prevention, for storage.

In other embodiments, the LB subnet(s) 622 contained in the control plane VCN 616 can be configured to receive a signal from the service gateway 636. In this embodiment, the control plane VCN 616 and the data plane VCN 618 may be configured to be called by a customer of the IaaS provider without calling public Internet 654. Customers of the IaaS provider may desire this embodiment since database(s) that the customers use may be controlled by the IaaS provider and may be stored on the service tenancy 619, which may be isolated from public Internet 654.

Figure 7:
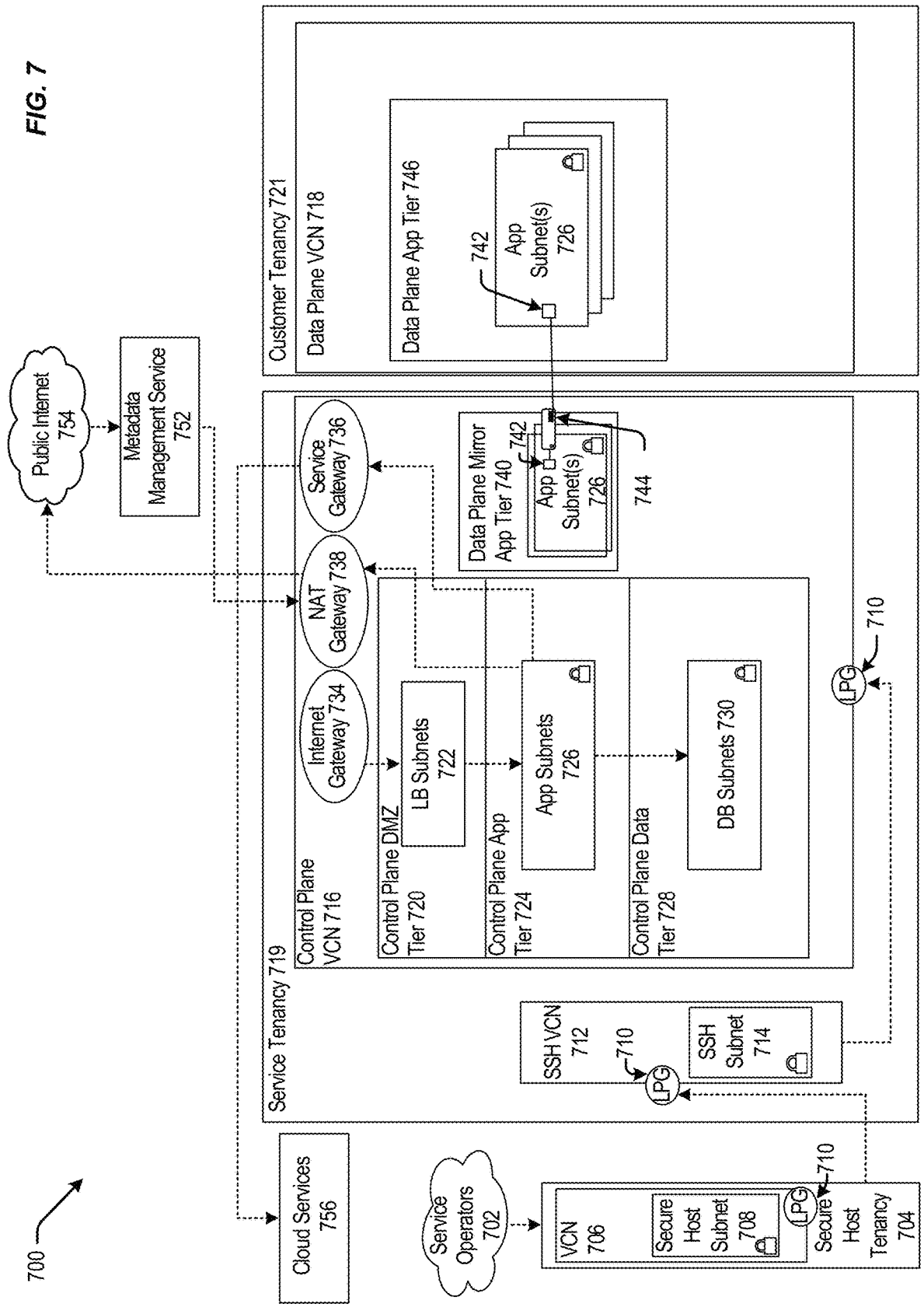
FIG. 7 is a block diagram illustrating another pattern for implementing a cloud infrastructure as a service system, according to at least one embodiment.

FIG. 7 is a block diagram 700 illustrating another example pattern of an IaaS architecture, according to at least one embodiment. Service operators 702 (e.g., service operators 602 of FIG. 6) can be communicatively coupled to a secure host tenancy 704 (e.g., the secure host tenancy 604 of FIG. 6) that can include a virtual cloud network (VCN) 706 (e.g., the VCN 606 of FIG. 6) and a secure host subnet 708 (e.g., the secure host subnet 608 of FIG. 6). The VCN 706 can include a local peering gateway (LPG) 710 (e.g., the LPG 610 of FIG. 6) that can be communicatively coupled to a secure shell (SSH) VCN 712 (e.g., the SSH VCN 612 of FIG. 6) via an LPG 610 contained in the SSH VCN 712. The SSH VCN 712 can include an SSH subnet 714 (e.g., the SSH subnet 614 of FIG. 6), and the SSH VCN 712 can be communicatively coupled to a control plane VCN 716 (e.g., the control plane VCN 616 of FIG. 6) via an LPG 710 contained in the control plane VCN 716. The control plane VCN 716 can be contained in a service tenancy 719 (e.g., the service tenancy 619 of FIG. 6), and the data plane VCN 718 (e.g., the data plane VCN 618 of FIG. 6) can be contained in a customer tenancy 721 that may be owned or operated by users, or customers, of the system.

The control plane VCN 716 can include a control plane DMZ tier 720 (e.g., the control plane DMZ tier 620 of FIG. 6) that can include LB subnet(s) 722 (e.g., LB subnet(s) 622 of FIG. 6), a control plane app tier 724 (e.g., the control plane app tier 624 of FIG. 6) that can include app subnet(s) 726 (e.g., app subnet(s) 626 of FIG. 6), a control plane data tier 728 (e.g., the control plane data tier 628 of FIG. 6) that can include database (DB) subnet(s) 730 (e.g., similar to DB subnet(s) 630 of FIG. 6). The LB subnet(s) 722 contained in the control plane DMZ tier 720 can be communicatively coupled to the app subnet(s) 726 contained in the control plane app tier 724 and an Internet gateway 734 (e.g., the Internet gateway 634 of FIG. 6) that can be contained in the control plane VCN 716, and the app subnet(s) 726 can be communicatively coupled to the DB subnet(s) 730 contained in the control plane data tier 728 and a service gateway 736 (e.g., the service gateway 636 of FIG. 6) and a network address translation (NAT) gateway 738 (e.g., the NAT gateway 638 of FIG. 6). The control plane VCN 716 can include the service gateway 736 and the NAT gateway 738.

The control plane VCN 716 can include a data plane mirror app tier 740 (e.g., the data plane mirror app tier 640 of FIG. 6) that can include app subnet(s) 726. The app subnet(s) 726 contained in the data plane mirror app tier 740 can include a virtual network interface controller (VNIC) 742 (e.g., the VNIC of 642) that can execute a compute instance 744 (e.g., similar to the compute instance 644 of FIG. 6). The compute instance 744 can facilitate communication between the app subnet(s) 726 of the data plane mirror app tier 740 and the app subnet(s) 726 that can be contained in a data plane app tier 746 (e.g., the data plane app tier 646 of FIG. 6) via the VNIC 742 contained in the data plane mirror app tier 740 and the VNIC 742 contained in the data plane app tier 746.

The Internet gateway 734 contained in the control plane VCN 716 can be communicatively coupled to a metadata management service 752 (e.g., the metadata management service 652 of FIG. 6) that can be communicatively coupled to public Internet 754 (e.g., public Internet 654 of FIG. 6). Public Internet 754 can be communicatively coupled to the NAT gateway 738 contained in the control plane VCN 716. The service gateway 736 contained in the control plane VCN 716 can be communicatively couple to cloud services 756 (e.g., cloud services 656 of FIG. 6).

In some examples, the data plane VCN 718 can be contained in the customer tenancy 721. In this case, the IaaS provider may provide the control plane VCN 716 for each customer, and the IaaS provider may, for each customer, set up a unique compute instance 744 that is contained in the service tenancy 719. Each compute instance 744 may allow communication between the control plane VCN 716, contained in the service tenancy 719, and the data plane VCN 718 that is contained in the customer tenancy 721. The compute instance 744 may allow resources, that are provisioned in the control plane VCN 716 that is contained in the service tenancy 719, to be deployed or otherwise used in the data plane VCN 718 that is contained in the customer tenancy 721.

In other examples, the customer of the IaaS provider may have databases that live in the customer tenancy 721. In this example, the control plane VCN 716 can include the data plane mirror app tier 740 that can include app subnet(s) 726. The data plane mirror app tier 740 can reside in the data plane VCN 718, but the data plane mirror app tier 740 may not live in the data plane VCN 718. That is, the data plane mirror app tier 740 may have access to the customer tenancy 721, but the data plane mirror app tier 740 may not exist in the data plane VCN 718 or be owned or operated by the customer of the IaaS provider. The data plane mirror app tier 740 may be configured to make calls to the data plane VCN 718 but may not be configured to make calls to any entity contained in the control plane VCN 716. The customer may desire to deploy or otherwise use resources in the data plane VCN 718 that are provisioned in the control plane VCN 716, and the data plane mirror app tier 740 can facilitate the desired deployment, or other usage of resources, of the customer.

In some embodiments, the customer of the IaaS provider can apply filters to the data plane VCN 718. In this embodiment, the customer can determine what the data plane VCN 718 can access, and the customer may restrict access to public Internet 754 from the data plane VCN 718. The IaaS provider may not be able to apply filters or otherwise control access of the data plane VCN 718 to any outside networks or databases. Applying filters and controls by the customer onto the data plane VCN 718, contained in the customer tenancy 721, can help isolate the data plane VCN 718 from other customers and from public Internet 754.

In some embodiments, cloud services 756 can be called by the service gateway 736 to access services that may not exist on public Internet 754, on the control plane VCN 716, or on the data plane VCN 718. The connection between cloud services 756 and the control plane VCN 716 or the data plane VCN 718 may not be live or continuous. Cloud services 756 may exist on a different network owned or operated by the IaaS provider. Cloud services 756 may be configured to receive calls from the service gateway 736 and may be configured to not receive calls from public Internet 754. Some cloud services 756 may be isolated from other cloud services 756, and the control plane VCN 716 may be isolated from cloud services 756 that may not be in the same region as the control plane VCN 716. For example, the control plane VCN 716 may be located in "Region 1," and cloud service "Deployment 6," may be located in Region 1 and in "Region 2." If a call to Deployment 6 is made by the service gateway 736 contained in the control plane VCN 716 located in Region 1, the call may be transmitted to Deployment 6 in Region 1. In this example, the control plane VCN 716, or Deployment 6 in Region 1, may not be communicatively coupled to, or otherwise in communication with, Deployment 6 in Region 2.

Figure 8:
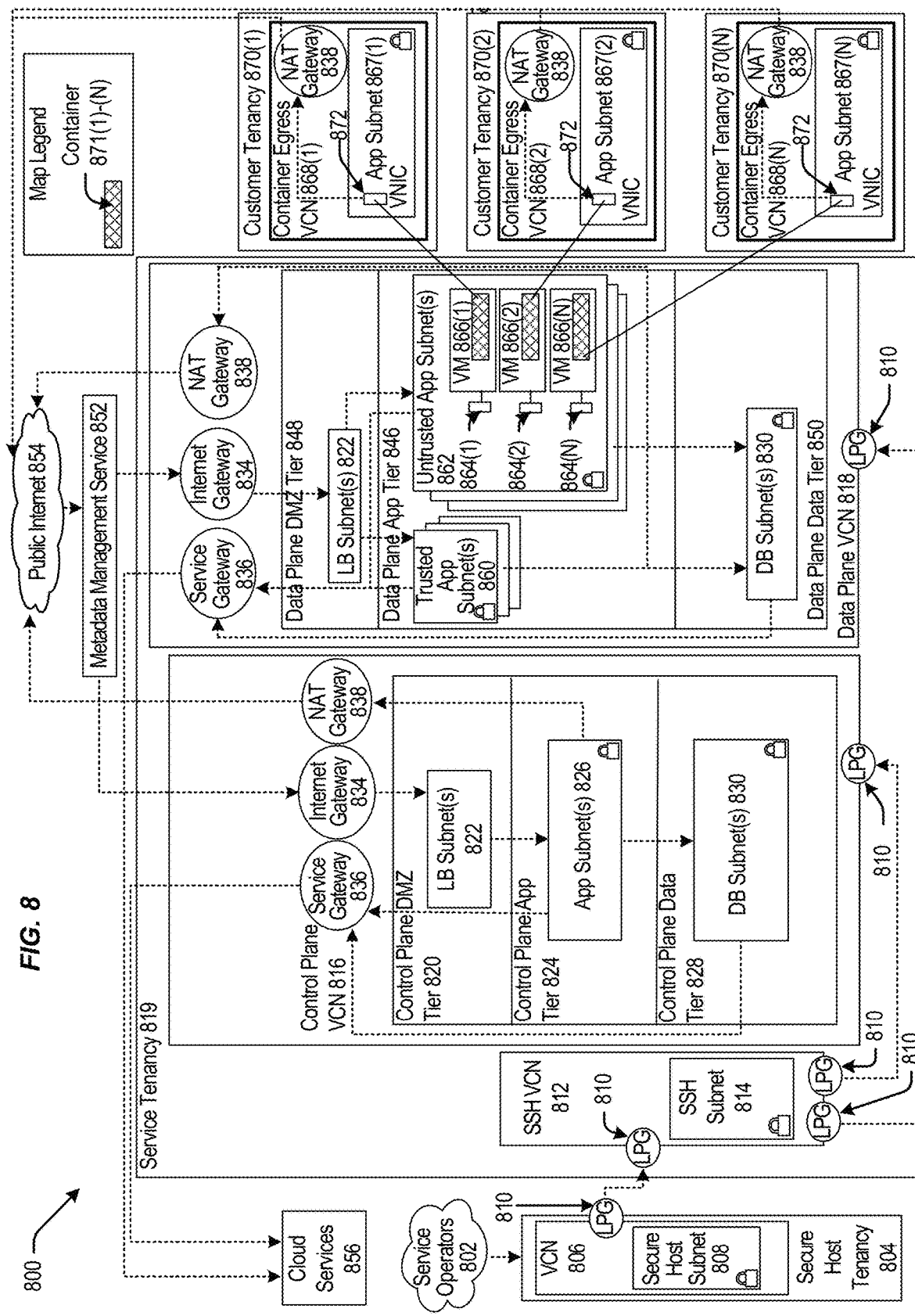
FIG. 8 is a block diagram illustrating another pattern for implementing a cloud infrastructure as a service system, according to at least one embodiment.

FIG. 8 is a block diagram 800 illustrating another example pattern of an IaaS architecture, according to at least one embodiment. Service operators 802 (e.g., service operators 602 of FIG. 6) can be communicatively coupled to a secure host tenancy 804 (e.g., the secure host tenancy 604 of FIG. 6) that can include a virtual cloud network (VCN) 806 (e.g., the VCN 606 of FIG. 6) and a secure host subnet 808 (e.g., the secure host subnet 608 of FIG. 6). The VCN 806 can include an LPG 810 (e.g., the LPG 610 of FIG. 6) that can be communicatively coupled to an SSH VCN 812 (e.g., the SSH VCN 612 of FIG. 6) via an LPG 810 contained in the SSH VCN 812. The SSH VCN 812 can include an SSH subnet 814 (e.g., the SSH subnet 614 of FIG. 6), and the SSH VCN 812 can be communicatively coupled to a control plane VCN 816 (e.g., the control plane VCN 616 of FIG. 6) via an LPG 810 contained in the control plane VCN 816 and to a data plane VCN 818 (e.g., the data plane 618 of FIG. 6) via an LPG 810 contained in the data plane VCN 818. The control plane VCN 816 and the data plane VCN 818 can be contained in a service tenancy 819 (e.g., the service tenancy 619 of FIG. 6).

The control plane VCN 816 can include a control plane DMZ tier 820 (e.g., the control plane DMZ tier 620 of FIG. 6) that can include load balancer (LB) subnet(s) 822 (e.g., LB subnet(s) 622 of FIG. 6), a control plane app tier 824 (e.g., the control plane app tier 624 of FIG. 6) that can include app subnet(s) 826 (e.g., similar to app subnet(s) 626 of FIG. 6), a control plane data tier 828 (e.g., the control plane data tier 628 of FIG. 6) that can include DB subnet(s) 830. The LB subnet(s) 822 contained in the control plane DMZ tier 820 can be communicatively coupled to the app subnet(s) 826 contained in the control plane app tier 824 and to an Internet gateway 834 (e.g., the Internet gateway 634 of FIG. 6) that can be contained in the control plane VCN 816, and the app subnet(s) 826 can be communicatively coupled to the DB subnet(s) 830 contained in the control plane data tier 828 and to a service gateway 836 (e.g., the service gateway of FIG. 6) and a network address translation (NAT) gateway 838 (e.g., the NAT gateway 638 of FIG. 6). The control plane VCN 816 can include the service gateway 836 and the NAT gateway 838.

The data plane VCN 818 can include a data plane app tier 846 (e.g., the data plane app tier 646 of FIG. 6), a data plane DMZ tier 848 (e.g., the data plane DMZ tier 648 of FIG. 6), and a data plane data tier 850 (e.g., the data plane data tier 650 of FIG. 6). The data plane DMZ tier 848 can include LB subnet(s) 822 that can be communicatively coupled to trusted app subnet(s) 860 and untrusted app subnet(s) 862 of the data plane app tier 846 and the Internet gateway 834 contained in the data plane VCN 818. The trusted app subnet(s) 860 can be communicatively coupled to the service gateway 836 contained in the data plane VCN 818, the NAT gateway 838 contained in the data plane VCN 818, and DB subnet(s) 830 contained in the data plane data tier 850. The untrusted app subnet(s) 862 can be communicatively coupled to the service gateway 836 contained in the data plane VCN 818 and DB subnet(s) 830 contained in the data plane data tier 850. The data plane data tier 850 can include DB subnet(s) 830 that can be communicatively coupled to the service gateway 836 contained in the data plane VCN 818.

The untrusted app subnet(s) 862 can include one or more primary VNICs 864(1)-(N) that can be communicatively coupled to tenant virtual machines (VMs) 866(1)-(N). Each tenant VM 866(1)-(N) can be communicatively coupled to a respective app subnet 867(1)-(N) that can be contained in respective container egress VCNs 868(1)-(N) that can be contained in respective customer tenancies 870(1)-(N). Respective secondary VNICs 872(1)-(N) can facilitate communication between the untrusted app subnet(s) 862 contained in the data plane VCN 818 and the app subnet contained in the container egress VCNs 868(1)-(N). Each container egress VCNs 868(1)-(N) can include a NAT gateway 838 that can be communicatively coupled to public Internet 854 (e.g., public Internet 654 of FIG. 6).

The Internet gateway 834 contained in the control plane VCN 816 and contained in the data plane VCN 818 can be communicatively coupled to a metadata management service 852 (e.g., the metadata management system 652 of FIG. 6) that can be communicatively coupled to public Internet 854. Public Internet 854 can be communicatively coupled to the NAT gateway 838 contained in the control plane VCN 816 and contained in the data plane VCN 818. The service gateway 836 contained in the control plane VCN 816 and contained in the data plane VCN 818 can be communicatively couple to cloud services 856.

In some embodiments, the data plane VCN 818 can be integrated with customer tenancies 870. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane app tier 846. Code to run the function may be executed in the VMs 866(1)-(N), and the code may not be configured to run anywhere else on the data plane VCN 818. Each VM 866(1)-(N) may be connected to one customer tenancy 870. Respective containers 871(1)-(N) contained in the VMs 866(1)-(N) may be configured to run the code. In this case, there can be a dual isolation (e.g., the containers 871(1)-(N) running code, where the containers 871(1)-(N) may be contained in at least the VM 866(1)-(N) that are contained in the untrusted app subnet(s) 862), which may help prevent incorrect or otherwise undesirable code from damaging the network of the IaaS provider or from damaging a network of a different customer. The containers 871(1)-(N) may be communicatively coupled to the customer tenancy 870 and may be configured to transmit or receive data from the customer tenancy 870. The containers 871(1)-(N) may not be configured to transmit or receive data from any other entity in the data plane VCN 818. Upon completion of running the code, the IaaS provider may kill or otherwise dispose of the containers 871(1)-(N).

In some embodiments, the trusted app subnet(s) 860 may run code that may be owned or operated by the IaaS provider. In this embodiment, the trusted app subnet(s) 860 may be communicatively coupled to the DB subnet(s) 830 and be configured to execute CRUD operations in the DB subnet(s) 830. The untrusted app subnet(s) 862 may be communicatively coupled to the DB subnet(s) 830, but in this embodiment, the untrusted app subnet(s) may be configured to execute read operations in the DB subnet(s) 830. The containers 871(1)-(N) that can be contained in the VM 866(1)-(N) of each customer and that may run code from the customer may not be communicatively coupled with the DB subnet(s) 830.

In other embodiments, the control plane VCN 816 and the data plane VCN 818 may not be directly communicatively coupled. In this embodiment, there may be no direct communication between the control plane VCN 816 and the data plane VCN 818. However, communication can occur indirectly through at least one method. An LPG 810 may be established by the IaaS provider that can facilitate communication between the control plane VCN 816 and the data plane VCN 818. In another example, the control plane VCN 816 or the data plane VCN 818 can make a call to cloud services 856 via the service gateway 836. For example, a call to cloud services 856 from the control plane VCN 816 can include a request for a service that can communicate with the data plane VCN 818.

Figure 9:
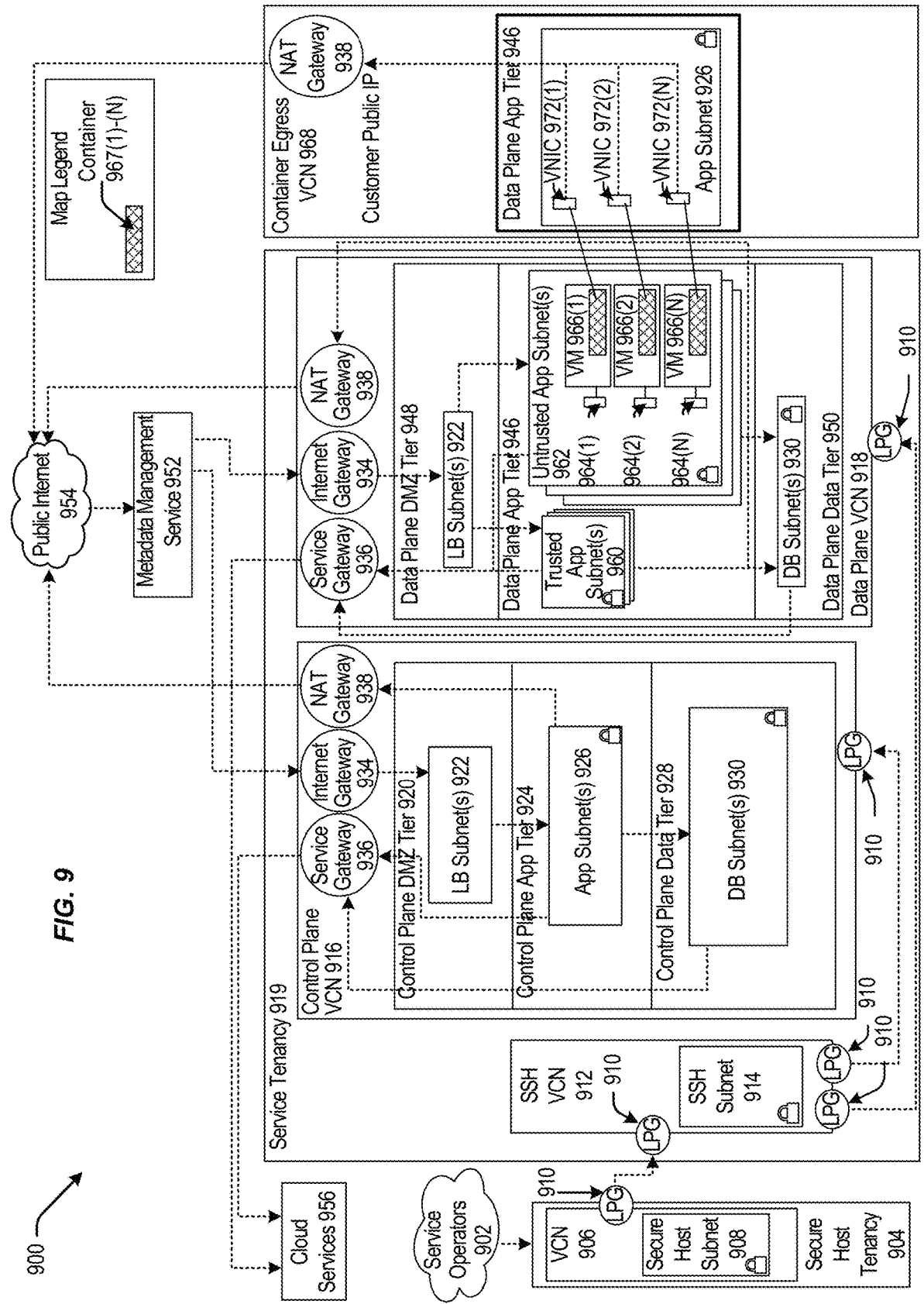
FIG. 9 is a block diagram illustrating another pattern for implementing a cloud infrastructure as a service system, according to at least one embodiment.

FIG. 9 is a block diagram 900 illustrating another example pattern of an IaaS architecture, according to at least one embodiment. Service operators 902 (e.g., service operators 602 of FIG. 6) can be communicatively coupled to a secure host tenancy 904 (e.g., the secure host tenancy 604 of FIG. 6) that can include a virtual cloud network (VCN) 906 (e.g., the VCN 606 of FIG. 6) and a secure host subnet 908 (e.g., the secure host subnet 608 of FIG. 6). The VCN 906 can include an LPG 910 (e.g., the LPG 610 of FIG. 6) that can be communicatively coupled to an SSH VCN 912 (e.g., the SSH VCN 612 of FIG. 6) via an LPG 910 contained in the SSH VCN 912. The SSH VCN 912 can include an SSH subnet 914 (e.g., the SSH subnet 614 of FIG. 6), and the SSH VCN 912 can be communicatively coupled to a control plane VCN 916 (e.g., the control plane VCN 616 of FIG. 6) via an LPG 910 contained in the control plane VCN 916 and to a data plane VCN 918 (e.g., the data plane 618 of FIG. 6) via an LPG 910 contained in the data plane VCN 918. The control plane VCN 916 and the data plane VCN 918 can be contained in a service tenancy 919 (e.g., the service tenancy 619 of FIG. 6).

The control plane VCN 916 can include a control plane DMZ tier 920 (e.g., the control plane DMZ tier 620 of FIG. 6) that can include LB subnet(s) 922 (e.g., LB subnet(s) 622 of FIG. 6), a control plane app tier 924 (e.g., the control plane app tier 624 of FIG. 6) that can include app subnet(s) 926 (e.g., app subnet(s) 626 of FIG. 6), a control plane data tier 928 (e.g., the control plane data tier 628 of FIG. 6) that can include DB subnet(s) 930 (e.g., DB subnet(s) 830 of FIG. 8). The LB subnet(s) 922 contained in the control plane DMZ tier 920 can be communicatively coupled to the app subnet(s) 926 contained in the control plane app tier 924 and to an Internet gateway 934 (e.g., the Internet gateway 634 of FIG. 6) that can be contained in the control plane VCN 916, and the app subnet(s) 926 can be communicatively coupled to the DB subnet(s) 930 contained in the control plane data tier 928 and to a service gateway 936 (e.g., the service gateway of FIG. 6) and a network address translation (NAT) gateway 938 (e.g., the NAT gateway 638 of FIG. 6). The control plane VCN 916 can include the service gateway 936 and the NAT gateway 938.

The data plane VCN 918 can include a data plane app tier 946 (e.g., the data plane app tier 646 of FIG. 6), a data plane DMZ tier 948 (e.g., the data plane DMZ tier 648 of FIG. 6), and a data plane data tier 950 (e.g., the data plane data tier 650 of FIG. 6). The data plane DMZ tier 948 can include LB subnet(s) 922 that can be communicatively coupled to trusted app subnet(s) 960 (e.g., trusted app subnet(s) 860 of FIG. 8) and untrusted app subnet(s) 962 (e.g., untrusted app subnet(s) 862 of FIG. 8) of the data plane app tier 946 and the Internet gateway 934 contained in the data plane VCN 918. The trusted app subnet(s) 960 can be communicatively coupled to the service gateway 936 contained in the data plane VCN 918, the NAT gateway 938 contained in the data plane VCN 918, and DB subnet(s) 930 contained in the data plane data tier 950. The untrusted app subnet(s) 962 can be communicatively coupled to the service gateway 936 contained in the data plane VCN 918 and DB subnet(s) 930 contained in the data plane data tier 950. The data plane data tier 950 can include DB subnet(s) 930 that can be communicatively coupled to the service gateway 936 contained in the data plane VCN 918.

The untrusted app subnet(s) 962 can include primary VNICs 964(1)-(N) that can be communicatively coupled to tenant virtual machines (VMs) 966(1)-(N) residing within the untrusted app subnet(s) 962. Each tenant VM 966(1)-(N) can run code in a respective container 967(1)-(N), and be communicatively coupled to an app subnet 926 that can be contained in a data plane app tier 946 that can be contained in a container egress VCN 968. Respective secondary VNICs 972(1)-(N) can facilitate communication between the untrusted app subnet(s) 962 contained in the data plane VCN 918 and the app subnet contained in the container egress VCN 968. The container egress VCN can include a NAT gateway 938 that can be communicatively coupled to public Internet 954 (e.g., public Internet 654 of FIG. 6).

The Internet gateway 934 contained in the control plane VCN 916 and contained in the data plane VCN 918 can be communicatively coupled to a metadata management service 952 (e.g., the metadata management system 652 of FIG. 6) that can be communicatively coupled to public Internet 954. Public Internet 954 can be communicatively coupled to the NAT gateway 938 contained in the control plane VCN 916 and contained in the data plane VCN 918. The service gateway 936 contained in the control plane VCN 916 and contained in the data plane VCN 918 can be communicatively couple to cloud services 956.

In some examples, the pattern illustrated by the architecture of block diagram 900 of FIG. 9 may be considered an exception to the pattern illustrated by the architecture of block diagram 800 of FIG. 8 and may be desirable for a customer of the IaaS provider if the IaaS provider cannot directly communicate with the customer (e.g., a disconnected region). The respective containers 967(1)-(N) that are contained in the VMs 966(1)-(N) for each customer can be accessed in real-time by the customer. The containers 967(1)-(N) may be configured to make calls to respective secondary VNICs 972(1)-(N) contained in app subnet(s) 926 of the data plane app tier 946 that can be contained in the container egress VCN 968. The secondary VNICs 972(1)-(N) can transmit the calls to the NAT gateway 938 that may transmit the calls to public Internet 954. In this example, the containers 967(1)-(N) that can be accessed in real-time by the customer can be isolated from the control plane VCN 916 and can be isolated from other entities contained in the data plane VCN 918. The containers 967(1)-(N) may also be isolated from resources from other customers.

In other examples, the customer can use the containers 967(1)-(N) to call cloud services 956. In this example, the customer may run code in the containers 967(1)-(N) that requests a service from cloud services 956. The containers 967(1)-(N) can transmit this request to the secondary VNICs 972(1)-(N) that can transmit the request to the NAT gateway that can transmit the request to public Internet 954. Public Internet 954 can transmit the request to LB subnet(s) 922 contained in the control plane VCN 916 via the Internet gateway 934. In response to determining the request is valid, the LB subnet(s) can transmit the request to app subnet(s) 926 that can transmit the request to cloud services 956 via the service gateway 936.

It should be appreciated that IaaS architectures 600, 700, 800, 900 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 10:
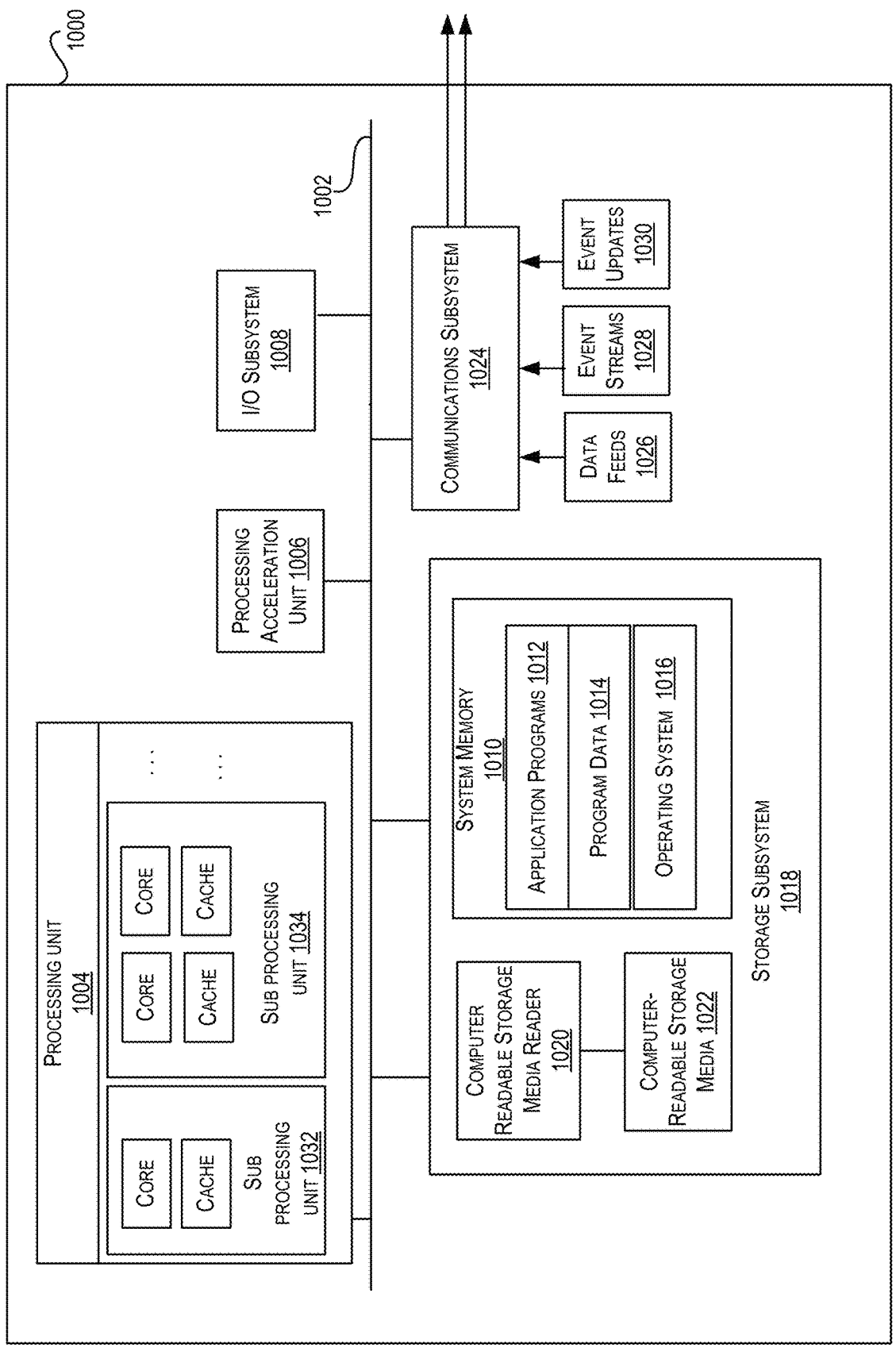
FIG. 10 is a block diagram illustrating an example computer system, according to at least one embodiment.

FIG. 10 illustrates an example computer system 1000, in which various embodiments may be implemented. The system 1000 may be used to implement any of the computer systems described above. As shown in the figure, computer system 1000 includes a processing unit 1004 that communicates with a number of peripheral subsystems via a bus subsystem 1002. These peripheral subsystems may include a processing acceleration unit 1006, an I/O subsystem 1008, a storage subsystem 1018 and a communications subsystem 1024. Storage subsystem 1018 includes tangible computer-readable storage media 1022 and a system memory 1010.

Bus subsystem 1002 provides a mechanism for letting the various components and subsystems of computer system 1000 communicate with each other as intended. Although bus subsystem 1002 is shown schematically as a single bus, alternative embodiments of the bus subsystem may utilize multiple buses. Bus subsystem 1002 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1004, which can be implemented as one or more integrated circuits (e.g., a conventional microprocessor or microcontroller), controls the operation of computer system 1000. One or more processors may be included in processing unit 1004. These processors may include single core or multicore processors. In certain embodiments, processing unit 1004 may be implemented as one or more independent processing units 1032 and/or 1034 with single or multicore processors included in each processing unit. In other embodiments, processing unit 1004 may also be implemented as a quad-core processing unit formed by integrating two dual-core processors into a single chip.

In various embodiments, processing unit 1004 can execute a variety of programs in response to program code and can maintain multiple concurrently executing programs or processes. At any given time, some or all of the program code to be executed can be resident in processor(s) 1004 and/or in storage subsystem 1018. Through suitable programming, processor(s) 1004 can provide various functionalities described above. Computer system 1000 may additionally include a processing acceleration unit 1006, which can include a digital signal processor (DSP), a special-purpose processor, and/or the like.

I/O subsystem 1008 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1000 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1000 may comprise a storage subsystem 1018 that provides a tangible non-transitory computer-readable storage medium for storing software and data constructs that provide the functionality of the embodiments described in this disclosure. The software can include programs, code modules, instructions, scripts, etc., that when executed by one or more cores or processors of processing unit 1004 provide the functionality described above. Storage subsystem 1018 may also provide a repository for storing data used in accordance with the present disclosure.

As depicted in the example in FIG. 10, storage subsystem 1018 can include various components including a system memory 1010, computer-readable storage media 1022, and a computer readable storage media reader 1020. System memory 1010 may store program instructions that are loadable and executable by processing unit 1004. System memory 1010 may also store data that is used during the execution of the instructions and/or data that is generated during the execution of the program instructions. Various different kinds of programs may be loaded into system memory 1010 including but not limited to client applications, Web browsers, mid-tier applications, relational database management systems (RDBMS), virtual machines, containers, etc.

System memory 1010 may also store an operating system 1016. Examples of operating system 1016 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, and Palm® OS operating systems. In certain implementations where computer system 1000 executes one or more virtual machines, the virtual machines along with their guest operating systems (GOSs) may be loaded into system memory 1010 and executed by one or more processors or cores of processing unit 1004.

System memory 1010 can come in different configurations depending upon the type of computer system 1000. For example, system memory 1010 may be volatile memory (such as random access memory (RAM)) and/or non-volatile memory (such as read-only memory (ROM), flash memory, etc.) Different types of RAM configurations may be provided including a static random access memory (SRAM), a dynamic random access memory (DRAM), and others. In some implementations, system memory 1010 may include a basic input/output system (BIOS) containing basic routines that help to transfer information between elements within computer system 1000, such as during start-up.

Computer-readable storage media 1022 may represent remote, local, fixed, and/or removable storage devices plus storage media for temporarily and/or more permanently containing, storing, computer-readable information for use by computer system 1000 including instructions executable by processing unit 1004 of computer system 1000.

Computer-readable storage media 1022 can include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media.

By way of example, computer-readable storage media 1022 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1022 may include, but is not limited to, Zip® drives, flash memory cards, universal serial bus (USB) flash drives, secure digital (SD) cards, DVD disks, digital video tape, and the like. Computer-readable storage media 1022 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1000.

Machine-readable instructions executable by one or more processors or cores of processing unit 1004 may be stored on a non-transitory computer-readable storage medium. A non-transitory computer-readable storage medium can include physically tangible memory or storage devices that include volatile memory storage devices and/or non-volatile storage devices. Examples of non-transitory computer-readable storage medium include magnetic storage media (e.g., disk or tapes), optical storage media (e.g., DVDs, CDs), various types of RAM, ROM, or flash memory, hard drives, floppy drives, detachable memory drives (e.g., USB drives), or other type of storage device.

Communications subsystem 1024 provides an interface to other computer systems and networks. Communications subsystem 1024 serves as an interface for receiving data from and transmitting data to other systems from computer system 1000. For example, communications subsystem 1024 may enable computer system 1000 to connect to one or more devices via the Internet. In some embodiments communications subsystem 1024 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1024 can provide wired network connectivity (e.g., Ethernet) in addition to or instead of a wireless interface.

In some embodiments, communications subsystem 1024 may also receive input communication in the form of structured and/or unstructured data feeds 1026, event streams 1028, event updates 1030, and the like on behalf of one or more users who may use computer system 1000.

By way of example, communications subsystem 1024 may be configured to receive data feeds 1026 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1024 may also be configured to receive data in the form of continuous data streams, which may include event streams 1028 of real-time events and/or event updates 1030, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 1024 may also be configured to output the structured and/or unstructured data feeds 1026, event streams 1028, event updates 1030, and the like to one or more databases that may be in communication with one or more streaming data source computers coupled to computer system 1000.

Computer system 1000 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1000 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or services are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method, comprising:
receiving, by a service component of a data plane, a request to access a cloud resource associated with a user, the service component running in an application container of the data plane;
determining, by the service component of the data plane, a proxy service of the data plane, the proxy service running in the application container;
transmitting, by the service component of the data plane, the request to access the cloud resource to the proxy service of the data plane;
generating, by the proxy service of the data plane, a proxy authentication comprising information identifying a private endpoint;
transmitting, by the proxy service of the data plane, the request to access the cloud resource and the proxy authentication to an egress proxy service of the data plane;
processing, by the egress proxy service of the data plane, the request to produce a processed request based at least in part on one or more attributes of the request;
determining, by the egress proxy service of the data plane, an address associated with the private endpoint based at least in part on one of the proxy authentication or the processed request;
transmitting, by the egress proxy service of the data plane, the processed request to access the cloud resource to the private endpoint; and
based at least in part on the processed request, providing, by the egress proxy service of the data plane and via the private endpoint, the service component with access to the cloud resource.

2. The method of claim 1, wherein the service component of the data plane is configured to generate the proxy authentication, and the service component transmits the request to access the cloud resource and the proxy authentication the egress proxy service.

3. The method of claim 1, wherein the request to access the cloud resource is initiated by the service component.

4. The method of claim 1, wherein the application container is accessed by a plurality of tenants, each user of the plurality of tenants associated with a specific private endpoint and a specific proxy service.

5. The method of claim 1, wherein the proxy authentication is included in a proxy authentication header.

6. The method of claim 1, wherein the proxy service comprises an adaptive proxy configured to process access requests using multiple proxy protocols.

7. The method of claim 1, wherein the processing comprises:
accessing one or more application programming interfaces (API) associated with the cloud resource; and
providing, to the service component and using the API, access to at least one of a private service and a private resource.

8. The method of claim 1, wherein the processing comprises:
accessing an internal resource comprising one or more access policies associated with at least one of a tenant, the service component, or the cloud resource; and determining that an access policy of the one or more access policies indicates that the service is permitted to access at least one of the private endpoint or the cloud resource.

9. The method of claim 1, wherein the proxy authentication is generated based at least in part on a local port used to send the request to access the cloud resource.

10. A system comprising:
one or more processors;
one or more non-transitory computer-readable media comprising instructions that when executed by the one or more processors, cause the system to perform operations to:
receive, by a service component, a request to access a cloud resource associated with a user, the service component running in an application container of a data plane;
determine, by the service component of the data plane, a proxy service of the data plane, the proxy service running in the application container;
transmit, by the service component of the data plane the request to access the cloud resource to the proxy service of the data plane;
generate, by the proxy service of the data plane, a proxy authentication comprising information identifying a private endpoint;
transmit, by the proxy service of the data plane, the request to access the cloud resource and the proxy authentication to an egress proxy service, the egress proxy configured to perform specialized processing on the request based at least in part on the request;
determine, by the egress proxy service of the data plane, an address associated with the private endpoint based at least in part on the proxy authentication;
transmit, by the egress proxy service of the data plane, the request to access the cloud resource to the private endpoint; and
provide, by the egress proxy service of the data plane and via the private endpoint, the service component with access to the cloud resource.

11. The system of claim 10, wherein the request to access the cloud resource is initiated by the service component.

12. The system of claim 10, wherein the application container is accessed by a plurality of tenants, each user of the plurality of tenants associated with a specific private endpoint and a specific proxy service.

13. The system of claim 10, wherein the proxy authentication is included in a proxy authentication header.

14. The system of claim 10, wherein the proxy service comprises an adaptive proxy configured to process access requests using multiple proxy protocols.

15. The system of claim 10, wherein the specialized processing comprises:
accessing one or more application programming interfaces (API) required by the cloud resource; and
providing, to the service component using the API, access to at least one of a private service and a private resource.

16. The system of claim 10, wherein the specialized processing the comprises:
accessing an internal resource comprising one or more access policies associated with at least one of a tenant, the service, or the resource; and
determining that an access policy of the one or more access policies indicates that the service is permitted to access at least one of the private endpoint or the resource.

17. A non-transitory computer-readable storage medium storing a set of instructions that, when executed by one or more processors of a computer system, cause the computer system to perform operations comprising:
receiving, by a service component, a request to access a cloud resource associated with a user, the service component running in an application container of a data plane;
determining, by the service component of the data plane, a proxy service of the data plane, the proxy service running in the application container;
transmitting, by the service component of the data plane the request to access the cloud resource to the proxy service of the data plane;
generating, by the proxy service of the data plane, a proxy authentication comprising information identifying a private endpoint;
transmitting, by the proxy service of the data plane, the request to access the cloud resource and the proxy authentication to an egress proxy service, the egress proxy configured to perform specialized processing on the request based at least in part on the request;
determining, by the egress proxy service of the data plane, an address associated with the private endpoint based at least in part on the proxy authentication;
transmitting, by the egress proxy service of the data plane, the request to access the cloud resource to the private endpoint; and
providing, by the egress proxy service of the data plane and via the private endpoint, the service component with access to the cloud resource.

18. The non-transitory computer-readable storage medium of claim 17, wherein the application container is accessed by a plurality of tenants.

19. The non-transitory computer-readable storage medium of claim 18, each user of the plurality of tenants associated with a specific private endpoint and a specific proxy service.

20. The non-transitory computer-readable storage medium of claim 17, wherein the proxy service comprises an adaptive proxy configured to process access requests using multiple proxy protocols.

* * * * *

UNITED STATES PATENT AND TRADEMARK OFFICE
CERTIFICATE OF CORRECTION

| | | |
|---|---|---|
| PATENT NO. | : 12,355,768 B2 | Page 1 of 1 |
| APPLICATION NO. | : 18/211829 | |
| DATED | : July 8, 2025 | |
| INVENTOR(S) | : Doble et al. | |

It is certified that error appears in the above-identified patent and that said Letters Patent is hereby corrected as shown below:

In the Specification

In Column 8, Line 5, delete "SOCKS" and insert -- SOCKS5 --, therefor.

In Column 11, Line 23, delete "SOCKS" and insert -- SOCKS5 --, therefor.

Signed and Sealed this
Fourteenth Day of October, 2025

John A. Squires
*Director of the United States Patent and Trademark Office*